US012634793B2

(12) United States Patent
Wu

(10) Patent No.: US 12,634,793 B2
(45) Date of Patent: May 19, 2026

(54) NETWORK PATH INSTANTIATION AND DYNAMIC DATA FLOW CONTROL

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 627 days.

(21) Appl. No.: 18/109,946

(22) Filed: Feb. 15, 2023

(65) Prior Publication Data

US 2024/0276341 A1     Aug. 15, 2024

(51) Int. Cl.
H04W 40/02       (2009.01)
H04W 28/12       (2009.01)
H04W 76/12       (2018.01)

(52) U.S. Cl.
CPC ........... H04W 40/02 (2013.01); H04W 28/12 (2013.01); H04W 76/12 (2018.02)

(58) Field of Classification Search
CPC ...... H04W 40/02; H04W 76/12; H04W 28/12
See application file for complete search history.

(56) References Cited

U.S. PATENT DOCUMENTS

2006/0198321 A1* 9/2006 Nadeau ................... H04L 45/50
                                                              370/254
2011/0238855 A1* 9/2011 Korsunsky .......... H04L 63/1441
                                                              709/231

2012/0324100 A1* 12/2012 Tomici .................. H04M 15/66
                                                              709/224
2014/0094180 A1* 4/2014 Zhou ..................... H04W 40/02
                                                              455/445
2016/0080502 A1* 3/2016 Yadav ................... H04L 47/825
                                                              709/227
2018/0220327 A1* 8/2018 Karampatsis ....... H04W 72/569
                    (Continued)

OTHER PUBLICATIONS

Fairhurst, G. Ed., Services Provided by IETF "Transport Protocols and Congestion Control Mechanisms", Internet Engineering Task Force (IETF), Mar. 2017, pp. 1-108.
(Continued)

*Primary Examiner* — Ajay Cattungal
(74) *Attorney, Agent, or Firm* — Armis IP Law, LLC

(57) ABSTRACT

A communication management resource receives a request from a communication device to communicate with a remote network node. In response to receiving the request, the communication management resource communicates with a first network node in a network to establish a communication path including the first network node to the remote network node. The first network node establishes a first segment of the communication path to a second network node, the second network node establishes a second segment of the communication path to a third network node, and so on to the remote network node. The communication management resource controls use of bandwidth along the communication path such as via communication with the first network node. Subsequent to establishment of the communication path, communicating data from received from the communication device over the network path to the remote network node.

31 Claims, 12 Drawing Sheets

(56) References Cited

U.S. PATENT DOCUMENTS

| | | | |
|---|---|---|---|
| 2019/0182213 A1* | 6/2019 | Saavedra | H04L 63/0263 |
| 2019/0357288 A1* | 11/2019 | Palanisamy | H04W 8/04 |
| 2021/0014739 A1* | 1/2021 | Xin | H04W 28/0268 |
| 2021/0144028 A1* | 5/2021 | Yu | H04L 45/74 |
| 2024/0267336 A1* | 8/2024 | Yang | H04L 47/20 |

OTHER PUBLICATIONS

Iyengar, J., Ed, Quic: "A UDP-Based Multiplexed and Secure Transport", Internet Engineering Task Force (IETF), May 2021, pp. 1-148.
Landström, Sara, "Congestion Control in Wireless Cellular Networks", Licentiate Thesis, Mar. 2005, pp. 1-99.

* cited by examiner

NETWORK PATH INSTANTIATION AND DYNAMIC DATA FLOW CONTROL

BACKGROUND

A data flow policy rule typically applies only when the total bandwidth of all device applications in a group is greater than a limit associated with the group. Typically, the bandwidth limit associated with the group (such as communication devices in a subscriber domain) is a pre-configured maximum possible amount for the multiple communication devices operated in the subscriber domain.

BRIEF DESCRIPTION OF EMBODIMENTS

As discussed herein, a bandwidth limit may be adjusted to a larger value when a household device application requests a guaranteed bandwidth.

For example, the total bandwidth can be set to a number B, then added with a guaranteed bandwidth C to be B+C for a household. The total bandwidth can be set to a number B+C<D when the physical limitation of the household max throughput is D.

A PCF (Policy Control Function) can be configured to maintain capacity consumption from a low profile device with a minimum throughput. A device receiving/sending low volume traffic normally is to keep a minimum signaling needed, network shall not drop this type of traffics, for example DHCP, ICMP messages. A threshold may be needed to differentiate this type of low profile traffic and it may be desirable to keep minimum device application executing and configurable. The policy may be either application dependent or device dependent.

Application specific thresholds require packet inspection and is only needed when a traffic congestion happens.

Further, this disclosure includes the observation that allowing applications and devices to demand a network bandwidth capacity can improve user experience and provide quality on customer demand in near real-time manner. To this end, examples herein include data communications in which application traffic (data) transmission through and over an established communication path (such as so-called E2E path or other data flow path) is controlled by policy algorithms in each core network node (router, switch, etc.). In such an instance, the data flows provide a steady, less bursty rate of conveying data. Advantageously, the established communication path can be configured to make use of any available bandwidth to support communications. In one example, an application sends communications in accordance with HTTP-API (Hypertext Transfer Protocol—Application Programming Interface type communications) to a first core network node in a communication path to implement bandwidth management. The first core network node sends the HTTPs API communications from the communication management resource to inform a next core node (such as second network node) to support the bandwidth management, and so on, through each of multiple nodes to a target destination.

As discussed herein, the corresponding policy control mechanisms can be configured to include an application sending an API command to control the one or more network nodes in the established communication path to inform which mission critical level of the application. In such an instance, this allows the network to convert the application types to the frequency of the policy control execution the data flow shall be transmitted. Additionally, it ensures other functions such as packet delivery speed being adjusted by each end node application. A communication management resource may provide multiple communication devices in a subscriber domain access to a remote network. A respective application on the communication management resource can be configured to manage a respective communication path through a network environment to respective remote network nodes. This enables the communication management resource to provide different communication devices in a subscriber domain different priority levels (such as bandwidth levels, latency levels, etc.) output current communications over the respective communication paths.

Accordingly, embodiments herein include novel ways of establishing data flow paths and controlling bandwidth conveying corresponding data flows over the established data flow paths.

More specifically, a communication management resource receives a request from a communication device to communicate with a remote network node. In response to receiving the request, the communication management resource communicates with a first network node in a network environment to establish a communication path including the first network node to the remote network node. In addition to a communication path segment between the communication management resource and the first network node, the first network node initiates and establishes a first segment of the communication path to a second network node, the second network node initiates and establishes a second segment of the communication path to a third network node, and so on along a communication path to the remote network node. The communication management resource controls use of bandwidth along the communication path such as via communication with the first network node. Subsequent to establishment of the communication path, the communication management resource communicates data received from the communication device over the network path to the remote network node.

In accordance with further examples, the communication management resource communicates a command in a control plane to the first network node. The command indicates to set up the communication path (such as a static communication path including control plane path and user data path) in the network between an application executed by the communication management hardware and the remote network node. Via HTTPs commands or in accordance with another communication protocol, the user data path (user plane) communication path supports conveyance of user data associated with the application in the communication management resource. Note that the one or more commands controlling the user plane path can be configured to include any suitable information such as: i) an identity of the communication device, ii) an identity of the remote network node, iii) an identity of the application executed on the communication management hardware, and iv) data flow bandwidth settings associated with the communication path.

Yet further, the one or more control commands as discussed herein cause the first network node to establish the communication path via forwarding (such as in accordance with forwarding tables) of the command to a second network node in the network. Forwarding of the command from the first network node to the second network node causes the second network node to be included in the communication path. Additionally, the communication of the control plane setup command causes the second network node to participate in establishing the communication path via forwarding (such as in accordance with forwarding tables) of the command to a third network node in the network. Forwarding of the command from the second network node to the third network node causes the third network node to be included in the communication path. Yet further, the command causes the third network node to participate in establishing the communication path via forwarding (such as in accordance with forwarding tables) of the command to a fourth network node in the network. Forwarding of the command from the third network node to the fourth network node causes the fourth network node to be included in the communication path. The communication path can include any number of network nodes. Eventually, a last network node in the sequence of network nodes (established in accordance with forwarding tables) establishes a last communication path segment to the remote network node at a terminal of the communication path.

Thus, the first network node can be configured to communicate with a second network node in the network based on forwarding information associated with the first network node. The forwarding information indicates the second network node as a next hop node with respect to the first network node to establish the communication path to the remote network node. Communicating with the first network node may include: from the communication management resource, communicating a path setup command from the communication management hardware to the first network node in accordance with an application layer communication protocol. The path setup command indicates settings in which to establish the communication path between the communication management hardware and the remote network node. In one example, the first network node is configured to communicate with the second network node in accordance with a respective communication protocol such as an application layer communication protocol in response to receiving the path setup command from the communication management hardware.

In accordance with still further examples, in a manner as previously discussed, the first network node can be configured to communicate the request for communication path setup to a second network node. Such a request prompts the first network node to communicate the request in the network based on forwarding information associated with the first network node. The forwarding information indicates the second network node as a next hop node to establish the communication path.

In yet further examples as discussed herein, communicating with the first network node includes communicating a path setup command from the communication management resource to the first network node. In response to communicating the path setup command, the communication management resource eventually receives a first acknowledgement message from the first network node. The first acknowledgement message indicates conveyance of the path setup command through a sequence of network nodes in the network to the remote network node. In other words, the first acknowledgment message indicates establishment of the communication path through the sequence of network nodes. Subsequent to receiving the first acknowledgement message, the communication management resource communicates one or more data flow control setting commands to the first network node. The communication management resource can be configured to dynamically adjust per-user bandwidth limitations associated with the communication path. For example, each data flow control setting command indicates to apply data flow control settings for a communication device in communication with the communication management resource. As further discussed herein, communication of the data flow control setting command prompts a respective network node of the network nodes in the sequence to establish the communication path via corresponding user plane functionality in the respective network node.

Further, in response to communicating a data flow control setting command to the first network node, the communication management resource can be configured to receive a second acknowledgement message from the first network node, the second acknowledgement message indicates application of the data flow control settings for the communication device to each of the network nodes in the sequence. Yet further, as previously discussed, the communication management resource establishes the communication path on behalf of the communication device to communicate with the remote network node. The communication management resource receives data from the communication device then communicates the data over the communication path (sequence of network nodes) to the remote network node (target communication device). Transmission of the data from the communication management hardware over the communication path includes conveyance of the data over the communication path via the corresponding user plane functionality in the network nodes in the sequence of network nodes between the communication management hardware and the remote network node.

Still further, examples discussed herein include, in response to the communication management resource receiving a notification to adjust bandwidth supported by the communication path for the communication device, the communication management resource communicates a bandwidth adjustment command to the first network node. As previously discussed, the first network node is one of multiple network nodes in a sequence of network nodes supporting the communication path between the communication management hardware and the remote network node. Communication of the bandwidth adjustment command to the first network node prompts the first network node to adjust a corresponding bandwidth limit to data originating from the communication device and transmitted over the communication path to the remote network node.

In accordance with yet further examples, in response to the communication management resource receiving a notification to provide supplemental bandwidth (to the corresponding communication device as extra bandwidth for use by the communication device) over a bandwidth limit assigned to a subscriber domain associated with the communication management resource, the communication management resource communicates a bandwidth adjustment command to the first network node. The extra reserved bandwidth enables the communication device to transmit data to or receive data from a remote network node. A service fee may apply to the subscriber domain for the extra bandwidth provided to the communication device.

Still further, as previously discussed, the first network node is one of multiple network nodes in a sequence of network nodes supporting the communication path between the communication management resource and the remote network node. Assume that a bandwidth adjustment command generated by the communication management resource may indicate that the supplemental bandwidth is to be applied to data flow control settings associated with the communication device in the communication path. In such an instance, communication of the bandwidth adjustment command to the first network node prompts one or more of the network nodes in the sequence to adjust a corresponding bandwidth limit to data originating from the communication device over the communication path to the remote network node.

Embodiments herein are useful over conventional techniques because they provide a communication management resource better control of communications in a network environment between multiple communication devices and multiple remote network nodes, especially in circumstances in which the communication management resource needs to manage an overall total bandwidth and corresponding supplemental bandwidth provided to the multiple communication devices in accordance with a bandwidth control policy.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including computer readable hardware storage such as a non-transitory computer-readable storage medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately located processor devices or hardware) to: receive a request from a communication device to communicate with a remote network node; in response to receiving the request, communicate with a first network node in a network to establish a communication path including the first network node to the remote network node; and subsequent to establishment of the communication path, communicate data from received from the communication device over the network path to the remote network node.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
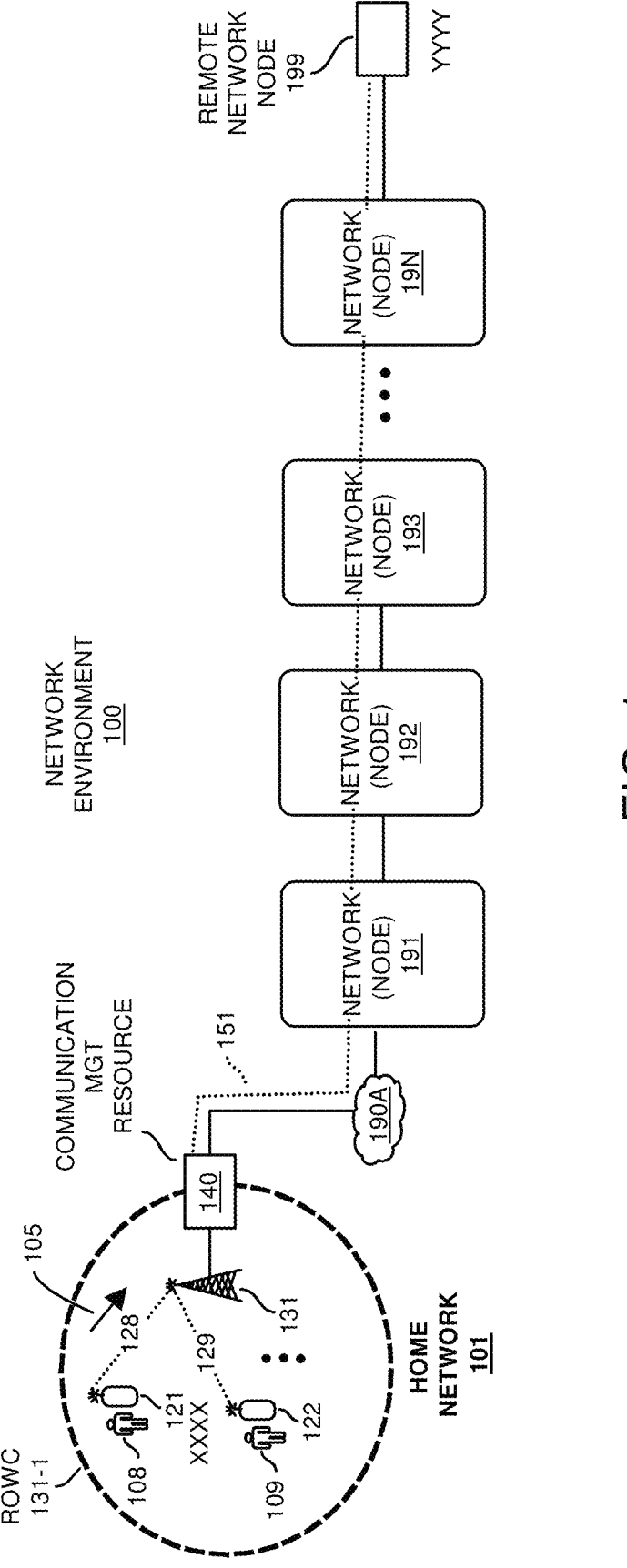
FIG. 1 is an example diagram illustrating a network environment and multiple network nodes supporting communications as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

As discussed herein, a communication management resource receives a request from a communication device to communicate with a remote network node. In response to receiving the request, the communication management resource communicates with a first network node in a network to establish a communication path including the first network node to the remote network node. The request may be generated for reservation of extra bandwidth in a network environment for use by a communication device. The first network node establishes a first segment of the communication path to a second network node, the second network node establishes a second segment of the communication path to a third network node, and so on to establish the communication path (such as supporting supplemental bandwidth) between communication management resource and the remote network node. The communication management resource controls use of bandwidth along the communication path and corresponding segments such as via communication of one or more subsequent commands to the first network node. For example, subsequent to establishment of the communication path, based on control settings applied to the communication path and corresponding one or more segments, the communication management resource communicates data received from a communication device over a user data flow path of the communication path to the remote network node. The communication management resource controls bandwidth assigned to the user data flow path of the communication path controls via a one or more commands over the control plane path of the communication path.

Now, more specifically, FIG. 1 is an example diagram illustrating a network environment supporting communications as discussed herein.

As shown in FIG. 1, network environment 100 includes home network 101, communication management resource 140 (such as assigned to the home network 101 such as a subscriber domain), network 190A, network node 191, network node 192, network node 193, . . . network node 19N, and remote network node 199. Home network 101 includes wireless access point 131, communication device 121, communication device 122, etc.

The combination of the communication management resource 140 and the network 190A can be implemented in any suitable manner. For example, the communication management resource can be configured to include a cable modem; the network 190A can be configured to include a cable modem termination system.

By way of a non-limiting example, each of the communication devices 121, 122, etc., can be any suitable type of device such as a cellular phone device, user equipment, mobile device, personal digital assistant, touch pad device, portable computer, wire-line telephone, wireless phone, wireless mobile device, etc. the communication devices are in communication with the wireless base station 131 and corresponding communication management resource 140.

Note that each of the functions as discussed herein can be implemented in any suitable manner. For example, each of the communication devices 121, 122, etc., in home network 101 can be implemented via communication device hardware, communication device software, or a combination of communication device hardware and communication device software; the communication management resource 140 associated with home network 101 can be implemented via communication management hardware, communication management software, or a combination of communication management hardware and communication management software; the network node 191 can be implemented via network node hardware, network node software, or a combination of network node hardware and network node software; the network node 192 can be implemented via network node hardware, network node software, or a combination of network node hardware and network node software; the network node 193 can be implemented via network node hardware, network node software, or a combination of network node hardware and network node software; the remote network node 199 can be implemented via network node hardware, network node software, or a combination of network node hardware and network node software; and so on.

During operation, the communication device 121 operated by the user 108 in the home network 101 (such as a subscriber domain in which a head of household subscriber pays for use of network services provided to communication devices 121, 122, etc.) communicates a request for content over the wired or wireless communication link 128 through the wireless access point 131 to communication management resource 140 via communications 105. In this example, assume that the communication management resource 140 receives a request (via communications 105) from a communication device 121 to communicate with a remote network node 199. The request can be to retrieve content from the remote network 199 or communicate data from the communication device 121 to the remote network node 199.

In response to receiving the request, the communication management resource 140 communicates through the network 190A to a first network node 191 in the network environment 100 (such as in accordance with HTTP-API or other suitable communication protocol) to establish a communication path 151 including the first network node to the remote network node 199. As further discussed herein, in furtherance of providing conveyance of data on behalf of the communication device 121 and corresponding user 108 to the remote network node 199, the first network node 191 (such as in accordance with HTTP-API or other suitable communication protocol) establishes a first segment of the communication path 151 to a second network node 192; the second network node 192 (such as in accordance with HTTP-API or other suitable communication protocol) establishes a second segment of the communication path 151 to a third network node 193, and so on to establish the communication path 151 between communication management resource 140 and the remote network node 199.

Yet further as discussed herein, the communication management resource 140 then controls use of bandwidth along or through the communication path 151 and corresponding segments such as via communication of one or more subsequent commands to the first network node 191. For example, subsequent to establishment of the communication path 151, based on control settings applied to the communication path 151 and corresponding one or more segments, the communication management resource 140 controls communication of data received from the communication device 121 over the communication path 151 to the remote network node 199.

More specifically, in one example, the communication management resource 140 controls throughput settings (bandwidth, priority, etc.) of one or more of the network nodes in the communication path 151 via generation and application of bandwidth settings (such communicated in accordance with HTTP-API or other suitable communication protocol) to the network nodes 191, 192, 193, etc. In accordance with the settings, the established communication path 151 and corresponding sequence of network nodes controls conveyance of the data associated with communication device 121 in an uplink from communication management resource 140 to the remote network node 199. Conversely, in accordance with the settings, the established communication path 151 and corresponding sequence of network nodes controls conveyance of the data (associated with communication device 121) in a downlink from the remote network node 199 to the communication management resource 140 for distribution to the communication device 121.

Figure 2:
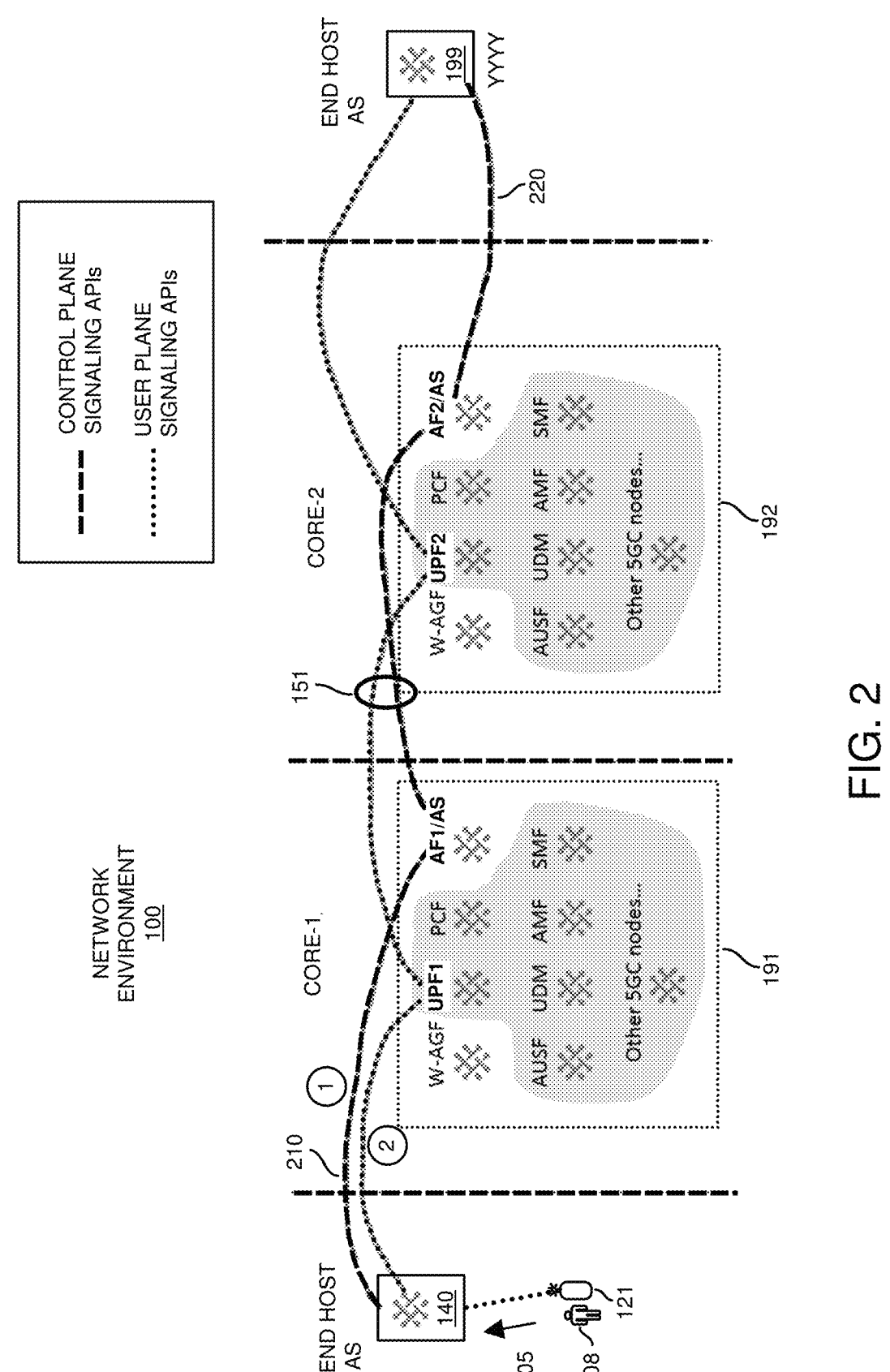
FIG. 2 is an example diagram illustrating implementation of a control plane path in the network environment of multiple core network nodes to establish corresponding user plane data flows (user data path) to provide connectivity of a first communication device to a remote communication device as discussed herein.

FIG. 2 is an example diagram illustrating implementation of a control plane in the network environment of multiple core networks to establish corresponding user plane data flows to provide connectivity of a first communication device to a remote communication device as discussed herein.

In one embodiment, the communication management resource 140 is implemented as or includes one or more application servers to facilitate communications between each of the communication devices and one or more remote network nodes.

In this example, each of the network nodes includes multiple communication functions such as a W-AGF (Wireless Access Gateway Function), UPF (User Plane Function), PCF (Policy Control Function), AF/AS (Application Function/Application Server), AUSF (Authentication Server Function). UDM (Unified Data Management) function, AMF (Access and Mobility Management Function), SMF (Session Management Function), etc.

As shown in FIG. 2, establishment of the communication path 151 first includes horizontal communications between the communication management resource 140 and each of the network nodes first setting up control plane signaling APIs (Application Programming Interfaces) amongst each of the different network nodes in the communication path 151 between the communication management resource 140 and the remote network node 199.

For example, in processing operation #1, the communication management resource 140 communicates with the AF1/AS function (Application Function/Application Server) in the network node 191. The communication management resource 140 notifies (via one or more communications) the AF1/AS function of the desire to establish a static and bandwidth controllable communication path 151 between the application server in the communication management resource 140 and an end host application server at the remote network node 199.

Notification of the request for the communication path 151 such as over the control plane signaling APIs of each of the network nodes prompts each of the nodes 191, 192, etc., to establish corresponding user plane signaling APIs paths 220 between the communication management resource 140 and the remote network node 199. In such an instance, the paths 210 provide control plane signaling for establishment and control of the corresponding user plane paths 220. Further details are illustrated in the following FIGS.

Figure 3:
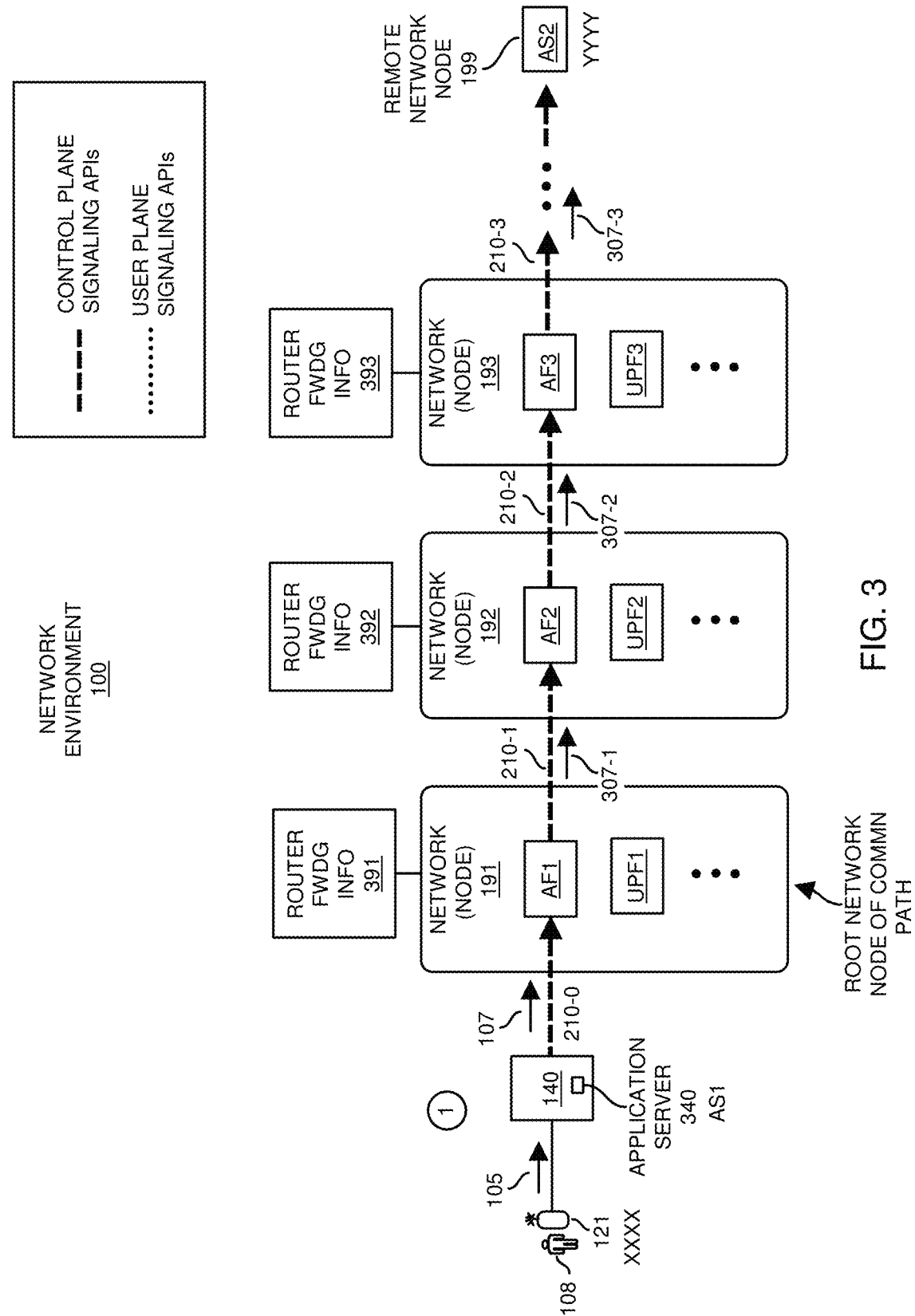
FIG. 3 is an example diagram illustrating horizontal conveyance of communications associated with each of multiple network nodes to establish a respective communication path between a first communication device in a subscriber domain and a remote network node as discussed herein.

FIG. 3 is an example diagram illustrating horizontal conveyance of communications associated with each of multiple network nodes through a control plane to establish a respective communication path between a first communication device and a remote network node as discussed herein.

As previously discussed, in response to receiving the request in communications 105 to establish connectivity such as a communication path to the remote network node 199, the application server 340 (managing communications on behalf of the communication device 121) in communication management resource 140 communicates a communication path request (such as command) in communications 107 to the application function AF1 (i.e., communication management function, access function, etc.) in the network node 191 over a control plane. In response to receiving the communication path request, the application function AF1 uses router (node) forwarding information 391 indicating a next network node in the network to best establish connectivity with the target remote network node 199. For example, based on the router forwarding information 391, the application function AF1 transmits communications 307-1 downstream to the selected network node 192 and corresponding application function AF2 (i.e., communication management function, access function, etc.).

Note that embodiments herein include implementation of a packet-switched network of nodes (191, 192, 193, etc.) to establish a respective communication path between the communication device 121 and the target destination of remote network node 199. For example, in one embodiment, the communications 107 indicate a source network address associated with the communication management resource 140 and/or communication device 121 as well as a destination network address of the remote network node 199. The network node 191 uses one or more of the network address information associated with the communication device 121, communication management resource 140, network node 191, and/or remote network node 199 applied to the router forwarding information 391 to determine the next best hop node (network node 192).

In response to receiving the request in communications 307-1 from the network node 191 (such as application function AF1 of the network node 191) to establish another segment of connectivity such as associated with a communication path to the remote network node 199, an application server or other suitable entity in the application function AF2 uses router (node) forwarding information 392 indicating a next network node in the network to best establish connectivity with the target remote network node 199. For example, the application function AF2 uses a target network address YYYY in the communications in the communications 307-1 to identify the remote network node 199 as the target network node. Based on application of the network address YYYY to the router forwarding information 392, the application function AF2 transmits communications 307-2 (request to establish a next segment of connectivity of the communication path) to the next hop node downstream to the selected network node 193 and, more specifically, corresponding application function AF3 (i.e., communication management function, access function, etc.).

As previously discussed, note that network environment 100 can be configured to include implementation of a packet-switched network of nodes (191, 192, 193, etc.) to establish a respective communication path between the communication device 121 and the target destination of remote network node 199. The communications 307-2 can be configured to indicate a source network address associated with the communication management resource 140 and/or communication device 121 as well as a destination network address YYYY of the remote network node 199. The application function AF2 of the network node 192 uses one or more of the network address information associated with the communication management resource 140, network node 191, network node 192, and/or remote network node 199 (such as network address YYYY) applied to the router forwarding information 392 to determine the next best hop node to the remote network node 199 as network node 193.

In response to receiving the request in communications 307-2 to establish another segment of connectivity such as associated with a communication path to the remote network node 199, an application server or other suitable entity in or associated with the application function AF3 uses router (node) forwarding information 393 indicating a next network node in the network to best establish connectivity with the target remote network node 199 assigned network address YYYY. For example, based on the router forwarding information 392, the application function AF3 transmits communications 307-3 (request to establish a next segment of connectivity of the communication path) downstream to a selected network node 193 and corresponding application function.

This process is repeated until a final network node in the communication path 151 provides connectivity to an application server in the remote network node 199. Each of the network nodes participates in establishing a respective static communication path 151 (such as including control path segment 210-0, control path segment 210-1, control path 210-2, control path 210-3, etc.) to the remote network node 199.

Figure 4:
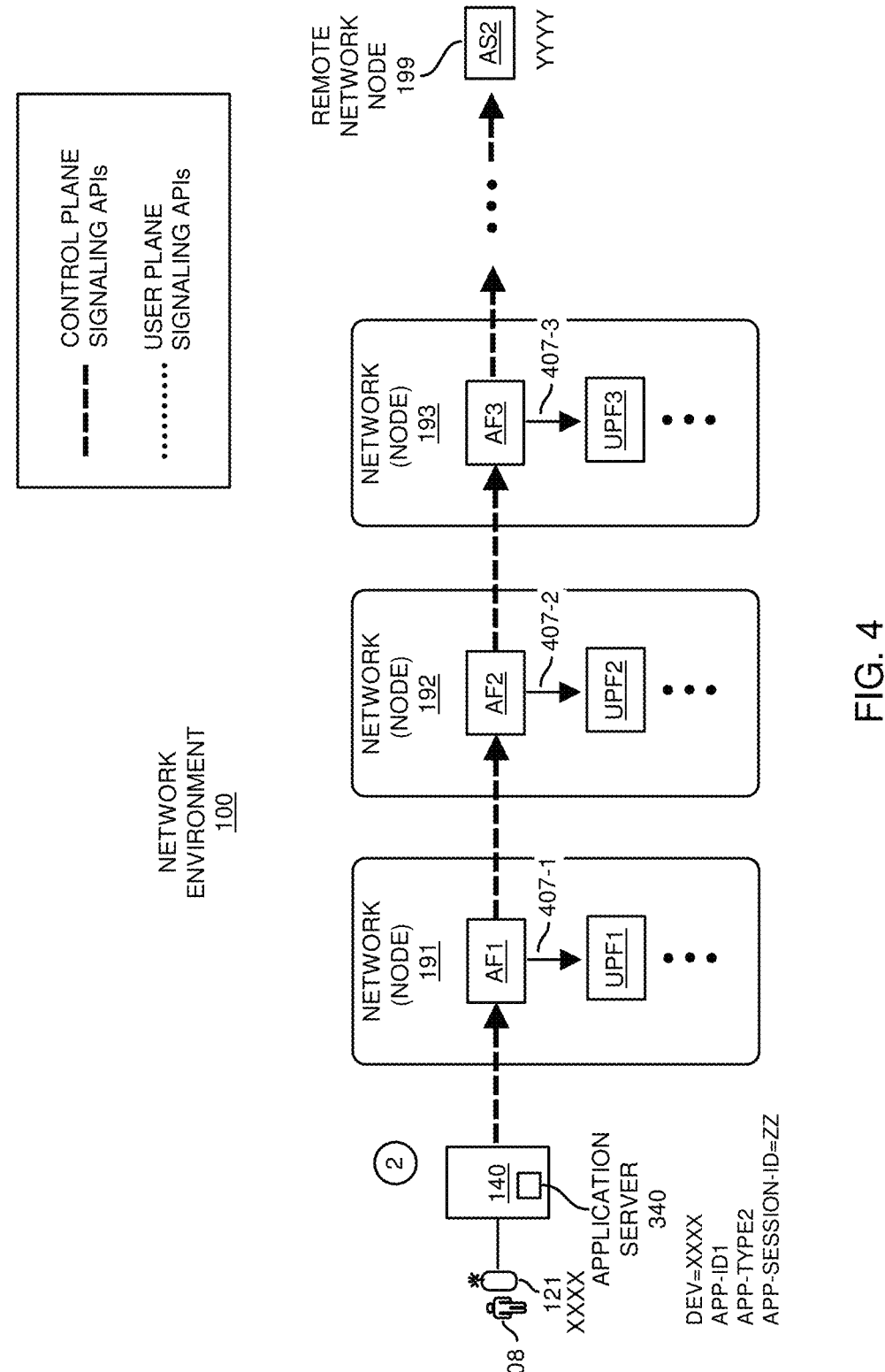
FIG. 4 is an example diagram illustrating vertical conveyance of communications in each of multiple core network nodes to establish respective user plane data flow paths to support conveyance of data between a first communication device and a remote network node as discussed herein.

FIG. 4 is an example diagram illustrating vertical conveyance of communications in each of multiple operators core network nodes to establish respective user plane data flow paths to support conveyance of data between a first communication device and a remote network node as discussed herein.

As further discussed herein, as a response to communications from the communication management resource 140 (such as in accordance with HTTP-API or other suitable communication protocol), the application functions in each of the network nodes communicates vertically (such as in accordance with HTTP-API or other suitable communication protocol) with their respective user plane functions to establish a data flow path associated with the requested communication path between the communication device 121 and the remote network node 199.

For example, in response to receiving the communications 107 indicating to set up a respective communication path, the application function AF1 of network node 191 communicates notification and/or control information 407-1 to the UPF1 function in network node 191 to establish a user plane data path to support data flows and corresponding data associated with the communication device 121.

In response to receiving the communications 307-1 from the application function AF1 of the network node 191 indicating to set up a respective communication path as previously discussed, the application function AF2 communicates notification and/or control information to the UPF2 function in network node 192 to establish a user plane data path to support data flows and corresponding data associated with the communication device 121.

In response to receiving the communication 307-2 indicating to set up a respective communication path, the application function AF3 communicates notification to the UPF3 function in network node 193 to establish a user plane data path to support data flows and corresponding data associated with the communication device 121.

This process repeats until the final network node establishes the user plane data path the remote network node 199. Results of establishing the user plane data path 220 is shown in FIG. 5.

Figure 5:
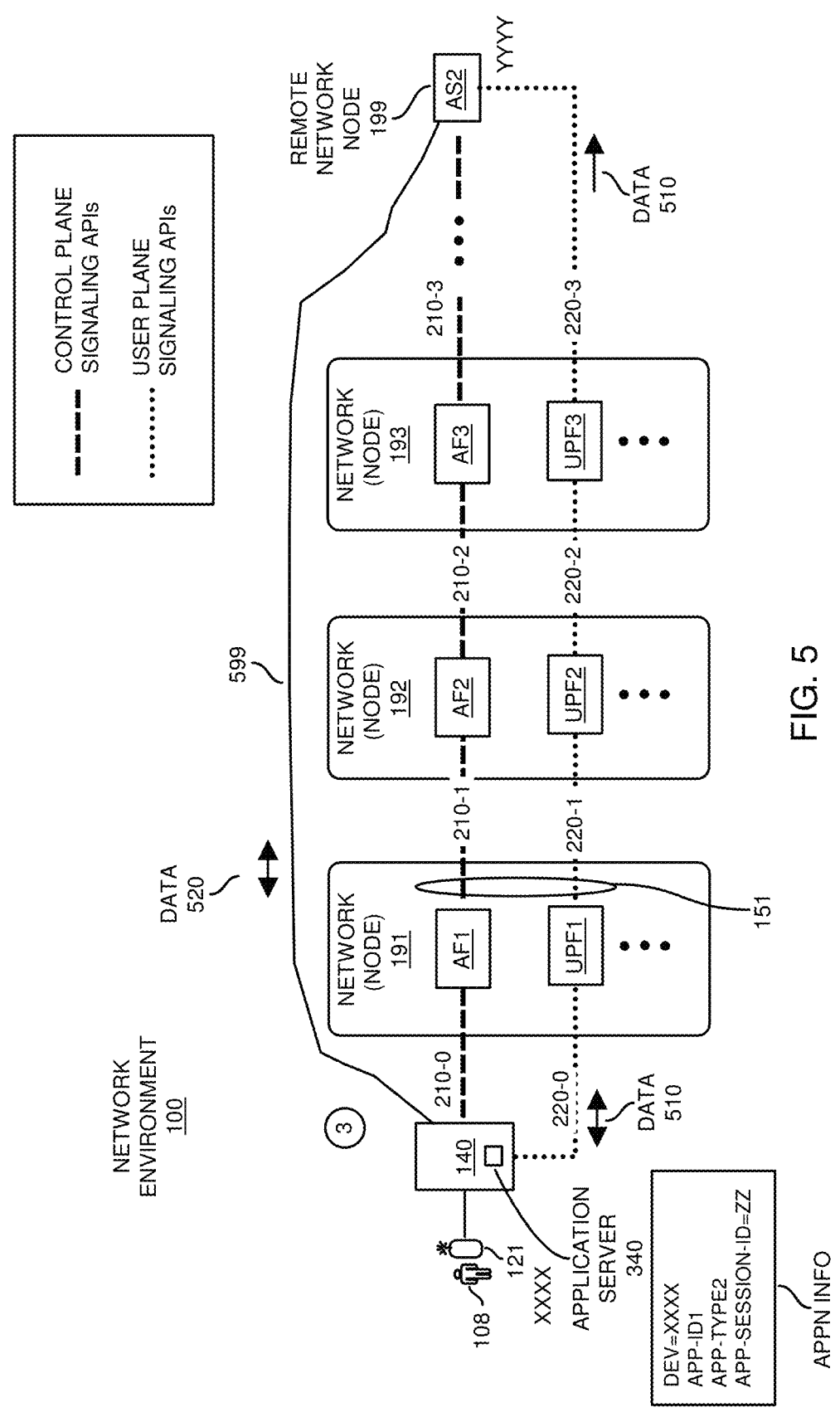
FIG. 5 is an example diagram illustrating an established control plane and respective user plane signaling in a communication path between a first communication device and a remote network node as discussed herein.

FIG. 5 is an example diagram illustrating an established control plane and respective user plane signaling in a communication path between a first communication device and a remote network node as discussed herein.

Application server 340 tracks application information associated with an application executing on the application server 340 providing communication path 151 and corresponding bandwidth control service to the communication device 121. For example, application information associated with the executed application includes information such as an identity (network address=XXXX) of the corresponding communication device 121, application identifier value APP-ID1 assigned to the application executing on the application server 340 to support communication path 151, application type APP-TYPE2 associated with the application executing on the application server 340 to support communication path 151, application session identifier ZZ assigned to the application session associated with the executing on the application server 340 to support communication path 151, In response to the communication management resource 140 and corresponding application APP-ID1 executing on the application server 340 communicating notification to the application function AF1 in network node 191 to establish a user plane data path to support data flows and corresponding data associated with the communication device 121, the communication management resource 140 and the network node 191 establish a segment 220-0 of the user plane data path 220 from the communication management resource 140 to the UPF1 function of the network node 191.

In response to the application function AF1 communicating notification (via communications 407-1) to the UPF1 function in network node 191 to establish a user plane data path of communication path 151 to support data flows and corresponding user data associated with the communication device 121, the UPF1 function establishes a segment 220-1 of the user plane data path to the UPF2 of the network node 192.

In response to the application function AF2 communicating notification (via communications 407-2 to the UPF2 function in network node 192) to establish a user plane data path of communication path 151 to support data flows and corresponding data associated with the communication device 121, the UPF2 function establishes a segment 220-2 of the user plane data path to the UPF3 of the network node 193.

In response to the application function AF3 communicating notification (via communications 407-3 to the UPF3 function in network node 193) to establish a user plane data path of communication path 151 to support data flows and corresponding data associated with the communication device 121, the UPF3 function establishes a segment 220-3 of the data flow communication path 220 to a next UPF function or remote network node 199 if it is the final network node in the sequence.

Thus, this process repeats until establishing the user plane data path 220 between the communication management resource 140 and the remote network node 199.

In such an instance, the user plane data path 220 associated with communication path 151 includes a sequence of network nodes such as: segment 220-0 of the data flow communication path 220 established between the application server 340 (and application APP-ID1) and the UPF1 function, a segment 220-1 of the user plane data path (a.k.a., data flow communication path) established between the UPF1 function and the UPF2 function, a segment 220-3 of the user plane data path (a.k.a., data flow communication path) established between the UPF2 function between the UPF3, and so on.

As further discussed herein, via the control plane path 210 and corresponding segments 210-1, 210-2, 210-3, etc., the communication management resource 140 can be configured to communicate one or more supplemental control commands associated with the user plane data path 220 to each of one or more of the application functions in the network nodes to update configuration settings associated with the corresponding UPF nodes (UPF1, UPF2, UPF3, etc.) and user plane data path 220. The settings control forwarding of the data 510 from the communication management resource 140 to the remote network node 199 along the data flow communication path 220. Additionally, or alternatively, the settings control forwarding of the data 510 along the user plane data path 220 from the remote network node 199 to the communication device 121.

In such an instance, the communication management resource 140 (and more specifically the application APP-ID1 executing on the application server 340) is able to control use of the established communication path 151 and corresponding flow of data 510 over the user plane data path 220. As previously discussed, the configuration commands from the communication management resource 140 over the control plane path 210 control communications (such as data 510) in the uplink direction from the communication management resource 140 to the application server AS2 at the remote network node 199 over the user plane data path 220 as well as in a downlink direction from the application server AS2 through the user plane data path 220 including sequence of network nodes and UPF3, UPF2, UPF1, etc., to the application server 340 of the communication management resource 140 and corresponding mobile communication device 121.

Note that the communication path 151 and corresponding user plane data path 220 may be a supplemental or reserved data path between the communication management resource 140 and the remote network node 199 with respect to another communication path 599 (such as a variable or static data path in the network environment 100 amongst multiple network nodes such as routers) supporting flow of data 520 between the communication management resource 140 and the remote network node 199 (AS2). The communication management resource 140 can be configured to setup the extra communication path 151 in response to detecting a condition that the user 108 is higher priority user entitled to supplemental bandwidth through the communication management resource 140. As an example, assume that the total bandwidth supported by the communication management resource 140 is 50 MBPS. If there are 5 users in the home network 101 using the total available bandwidth of 50, then each of those users is assigned or allocated use of 10 MBPS access from the network 101 to an outside network. If there are 4 users in the home network 101 using the total available bandwidth of 50, then each of those users is assigned or allocated 12.5 MBPS to an outside network.

Figure 6:
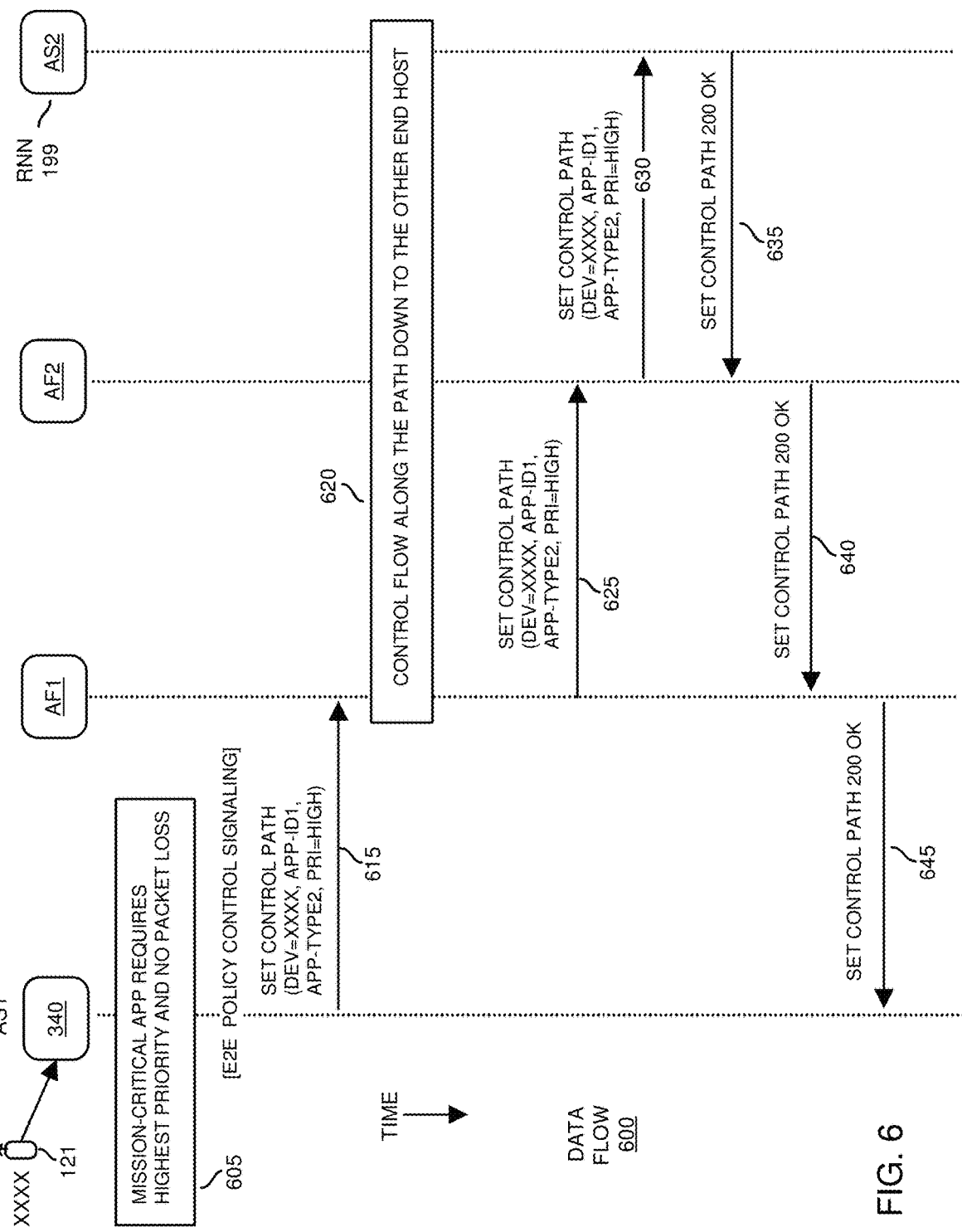
FIG. 6 is an example diagram illustrating horizontal setup of a control path and policy as discussed herein.

FIG. 6 is an example diagram illustrating horizontal setup of a control path and policy as discussed herein.

Note that each of the communications (such as communications 615, 620, 625, 630, etc.), as discussed herein can be any of one or more messages, commands, requests, etc. Each of the communications (such as communications 630, 635, 645, etc.), as discussed herein can be any of one or more messages, response, notifications, etc.).

In data flow 600, via function 605, the application server 340 (such as AS1 executing application APP-ID1) to service the communication device 121 runs on an end host (application server AS1) such as communication management resource 140 and represents an application. The application server AS1 receives a respective request to provide connectivity of the communication device 121 through network environment 100 to the application server AS2 of the remote network node 199.

In furtherance of providing the requested connectivity between the communication device 121 and the application server AS2 at the remote network node 199, via communications 615, the executed application APP-ID1 on server 340 sends a message (such as in accordance with HTTP-API or other suitable communication protocol) to the network node application function AF1 to establish the control plane path 210 and corresponding segments associated with the communication path 151. The communications 615 (such as set control path command) indicate information such as the corresponding application (service) associated with the application server 340 and application assigned APP-ID1. The communications 615 from the application server AS1 further indicate: i) the application identifier value APP-ID1 of the application executing on the application server AS1 on behalf of the communication device 121 such as executed application APP-ID1, ii) a source network address (such as MAC address or source network address XXXX or other suitable value) of the communication device 121, iii) application type (APP-TYPE2) associated with the executed application, iv) notification that a high priority communication service (application to network) as indicated by the setting PRI=High is needed by the communication device 121.

Thus, the control communications 615 can be configured to include application id (or name assigned to the application), application type (e.g., audio call, video conference, television stream, Internet serving or gaming, etc.). The priority value in communications 615 can be, for example, an integer ranging from 1 to 5 or other suitable value indicating a respective level of importance or level of quality associated with the communications to be conveyed over the communication path 151 for the communication device 121 assigned network address XXXX. The communications 615 may indicate bandwidth such as shown, for example, 10 MBPS (Mega Bits Per Second) to be reserved for the application (assigned APP_ID1) associated with application server 340.

In a manner as previously discussed, when the network node 191 (e.g. 5G core or Internet router, switch) and corresponding application function AF1 receives the communications 615, the application function AF1 of the corresponding node 191 converts the received message (communications 615) to a policy control mechanism to its user plane function (e.g. in 5G core, it's UPF—user plane function). See also subsequent drawings.

The application function AF1 and corresponding node 191 forwards the path request message to establish the control path 210 associated with the communication path 151 (via communications 615) to the next selected network node and corresponding hop application function AF2 in the path. As previously discussed, the application function AF1 or other suitable entity can be configured to use appropriate forwarding information 391 and packet IP header destination IP address specifying the remote network node 199 to determine the next best hop network node AF2.

Note that the network node 191 node may be configured to broadcast the message to its neighboring node if the broadcast option is configured. This option does not need to evaluate the E2E path.

As further shown in FIG. 6, via operations 620, the network nodes communicate to establish and control the communication path down to the end host such as remote network node 199 (application server AS2).

More specifically, in response to receiving communications 615, the application function AF1 (or application server function associated with AF1) transmits communications 625 (such as in accordance with HTTP-API or other suitable communication protocol) to a next selected network node 192 and corresponding application function AF2. In a similar manner as previously discussed, the communications 625 (such as set control path command) indicate: i) the identity of the communication device 121 such as network address XXXX, ii) application identifier APP-ID1 assigned to the application executing on application server on behalf of the mobile communication device 121, iii) type of data (APP-TYPE2) associated with the application and corresponding established communication path 151, and iv) priority level (i.e., high as indicated by PRI=High) assigned to the corresponding communication path 151 for communications conveyed on behalf of the communication device 121 (network address XXXX).

In response to receiving communications 625, the application function AF2 (or application server function associated with AF2 and network node 192) transmits communications 630 (such as in accordance with HTTP-API or other suitable communication protocol) to the application on the application server AS2 at the destination remote network node 199. In a similar manner as previously discussed, the communications 630 (such as set control path command) indicate: i) the identity of the communication device 121 such as network address XXXX, ii) application identifier APP-ID1 assigned to the application executing on application server AS1, iii) type of data associated with the application and corresponding established communication path 151, and iv) priority level (i.e., high as indicated by PRI=High) assigned to the corresponding communication path 151 for communications conveyed on behalf of the communication device 121 (network address XXXX). In this case, the communication path 151 includes network node 191 in network node 192. As previously discussed, the communication path established between the application server AS1 in the application server AS2 at the remote network node 199 can include any number of intermediate nodes.

Subsequent to establishing the final segment of the control plane path 210 (control communication path) of the communication path 151 between the network node 192 (application function AF2) and the destination node (remote network node 199), application server AS2 of the remote network node 199 communicates an acknowledgement response via communications 635 (such as in accordance with HTTP-API or other suitable communication protocol) to the application function AF2 of network node 192. The acknowledgement response in communications 635 confirms completion of setting up the control path 210 segment between the application server 340 (AS1) and the destination YYYY such as the remote network node 199.

In response to receiving the communications 635 indicating the acknowledgment of establishing the control path, the application function AF2 of the network node 192 communicates an acknowledgement response via communications 640 (such as in accordance with HTTP-API or other suitable communication protocol) to the application function AF1 of network node 191. The acknowledgement response confirms completion of setting up the control plane path 210 segment 210-1 between the application server 340 and the remote network node 199.

In response to receiving the communications 640 indicating the acknowledgment of establishing the control plane path 210, the application function AF1 of the network node 191 communicates an acknowledgement response via communications 645 (such as in accordance with HTTP-API or other suitable communication protocol) to the application server function AS1 in the communication management resource 340. In a similar manner as previously discussed, the acknowledgement response confirms completion of setting up the control path 210 between the application server 340 and the remote network node 199.

Thus, the overall horizontal flow of control communications through functions of the different network nodes in network environment 100 ensures that the network nodes selected (such as selected by each network node via forwarding tables) for the communication path (such as E2E path) are aware of the application data transfer bandwidth management parameters to be applied to the communications associated with the communication device 121 (XXXX). For example, when forwarding communications such as data packets associated with data 510 from the communication device 121 over the user plane data path 220 (i.e., data communication path), each of the different UPF application functions in respective nodes is aware of the different policy forwarding parameters to apply to data associated with data packets assigned a source network address XXXX, application ID of APP-ID1, data type APP-TYPE2, etc.). For example, when data 510 is received at the UPF1 function, the UPF1 function determines the data packets from the communication device 121 based on inspecting a source network address XXXX and/or destination network address YYYY in the data packets to apply an appropriate bandwidth and/or flow control through the communication path 151 as indicated by policy flow control parameters assigned to the communication path 151. As further discussed below, the communication management resource 140 can be configured to dynamically adjust the control parameters associated with the user plane data path used by the communication device 121 in accordance with control rules.

Figure 7:
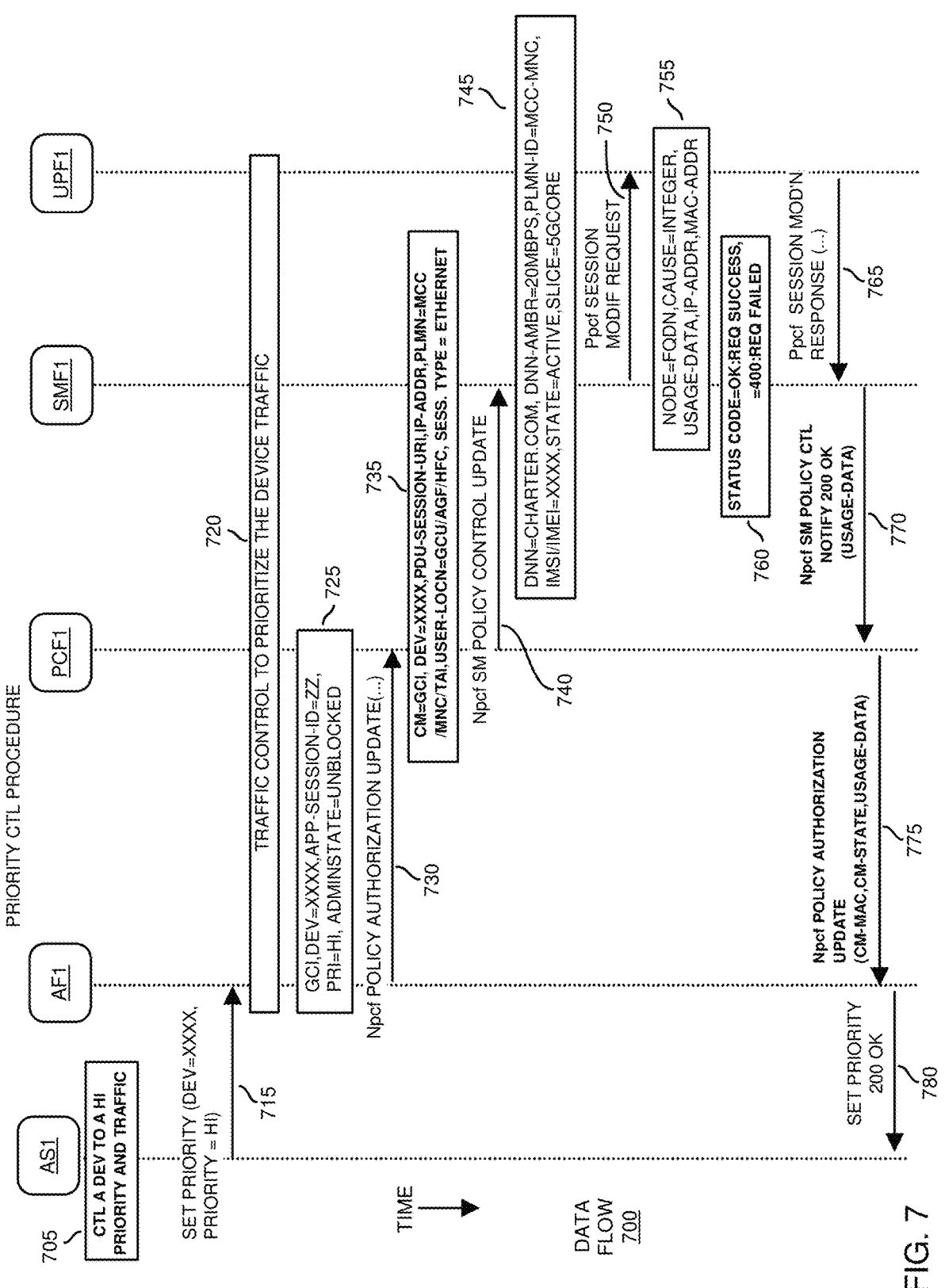
FIG. 7 is an example diagram illustrating vertical control in a respective network (or network node) to control operation of user data flows as discussed herein.

FIG. 7 is an example diagram illustrating vertical control of priority in a respective network (or network node) as discussed herein.

Note that each of the communications 715, 720, 740, 750, 765, 770, 775, 780, etc., can be transmitted in accordance with HTTP-API or other suitable communication protocol.

Additionally, note that each of the communications (such as communications 715, 720, 725, 730, 735, 740, 745, 750, 755, 760, etc.), as discussed herein can be any of one or more messages, commands, requests, etc. Each of the communications (such as communications 755, 760, 765, 770, 775, 780, etc.), as discussed herein can be any of one or more messages, response, notifications, etc.

In this example data flow 700, each of application function AF1 and application function AF2 in the communication path 151 represents a function in a respective core network node to establish the user plane data path 220 (a.k.a., data path). For example, each of the application functions convert the application required bandwidth management message commands from the communication management resource 140 or other application function node into the core node user plan function (UPF) settings to establish the user plane data path 220 associated with the communication path 151.

More specifically, as previously discussed, the application server AS1 in this example transmits communications 715 over control plane path 210 to the application function AF1 in node 191 to establish the user plane data path 220 associated with the communication path 151. The communications 715 can be configured to include information such as a set priority command specifying the source network address XXXX of the communication device 121 to which the priority command (715) pertains. The corresponding priority of communications associated with the communication device 121 as indicated in the set priority message (715) is set to high.

Via execution of function 720, the application function AF1 communicates with corresponding functions PCF1, SMF1, and UPF1 to implement traffic control data operations (over user plane data path 220 of the communication path 151) to prioritize the data traffic associated with the communication device 121 assigned the network address XXXX.

Yet further, via execution of function 725, the application function AF1 and PCF1 function produce information associated with the data flow policy such as GCI (Global Cable Identifier) indicating the subscriber domain (home network 101) in which the application server AS1 resides, network address XXXX of the communication device 121, session ID (ZZ) associated with the communication device 121, traffic priority level=high assigned to the communication device 121 (XXXX), admin state=unblocked associated with the communication device 121. Unblocked means that the communication path 151 is configured to convey data associated with the communication device 121.

Via communications 730, the application function AF1 communicates an Npcf policy authorization update notification to the policy control function PCF1 associated with the network node 191. For example, the application function AF1 sends control message to PCF1 (Policy Control Function) to set up a policy rule. The rule determines a device application and how the data traffic from that application is treated by the data forwarder (in UPF1) at network node 191.

Via function 735, the policy control function PCF1 generates information associated with the policy for a respective session.

Via communications 740 (such as modify policy command), the policy control function PCF1 communicates the Npcf policy control update notification to the session management function SMF1 of the network node 191. This causes the update of a control flow policy assigned to the user plane data path 220. This results in generation of the control information 745 such as DNN=CHARTER.COM, DNN-AMBR=20 MBPS, PLMN-ID=MCC-MNC, MSI/IMEI=XXXX, STATE=ACTIVE, SLICE=5 GCORE. The DNN-AMBR=20 MBPS indicates assignment of an extra 20 MBPS data flow for use by the communication device 121 to convey data 510 over the user plane data path 220.

The session management function SMF1 (Session Management Function) converts all data sessions under the policy rules defined in the PDU-Session-URI to some parameters UPF needs. The UPF QoS (quality of service) parameters are for example IP data flow QFI (Quality Flow Identifier), an integer which determines how the network buffer and transmit the data.

As previously discussed, assume that the subscriber domain (home network 101) is assigned 50 MBPS to communicate through the communication management resource 140 to the network environment 100. This bandwidth is potentially split up amongst the multiple communication devices in the home network 101 communicating with remote network nodes through the communication management resource 140. Via function 745, an additional 20 MBPS over the 50 MBPS is assigned to the communication device 121 and corresponding user plane data path 220 of the communication path 151. For example, the communication device 121 may be assigned a portion of the total 50 MBPS such as 10 MBPS of the 50 for use over the communication path 599. In such an instance, the corresponding communication path 151 (supplemental path) and user plane data path 220 support an extra 20 MBPS in addition to the 10 MBPS allocated to the communication device 121 through the communication management resource 140.

Thus, the 10 MBPS data conveyance in the network environment 100 and corresponding network nodes may be provided to the communication device 121 over a different (separate) communication path 599 through the network environment 100 than the communication path 151. For example, one communication path 599 in the network environment 100 may provide 10 MBPS of communications between the communication device 121 and the remote network node 199. The user plane data path 220 of the communication path 151 can be configured to provide an additional 20 MBPS between the communication device 121 and the application server AS2 of the remote network node 120).

Alternatively, there is no communication path 599 supporting conveyance of the communication device 121. In such an instance, the communication management resource 140 allocates 20 MBPS of the total 50 MBPS to the mobile communication device 121 through the communication management resource 140, leaving the left over 30 MBPS for use by the other communication devices in the home network 101.

Via communications 750, the session management function SMF1 communicates the Ppcf session modification request notification to the user plane function UPF1 of the network node 191.

The user plane function UPF1 executes the IP table and forwarding table function to determine the next hop node UPF2 as previously discussed.

Function 755 generates information including a node=fully qualified domain name, cause=integer, usage-data, IP-address, and MAC-ADDRESS XXXX associated with the communication device 121.

Via function 760, the function SMF1 generates a success or fail status associated with the policy update for the user plane data path 220.

Via communications 765, the user plane function UPF1 communicates a respective Ppcf session modification response notification to the session management function SMF1 indicating the policy update to the user plane data path 220.

Via communications 770, the session management function SMF1 communicates a respective Npcf session management policy control notification message to the policy control function PCF1.

Via communications 775, the policy control function PCF1 communicates a respective Npcf policy authorization update to the application function AF1.

Via communication 780, the application function AF1 notifies the application server AS1 and corresponding application executed by the communication management resource 140 that the set priority command and a respective traffic priority level is set up in the sequence of network nodes and user plane data path 220 of communication path 151 for communication device 121 has been completed.

Figure 8:
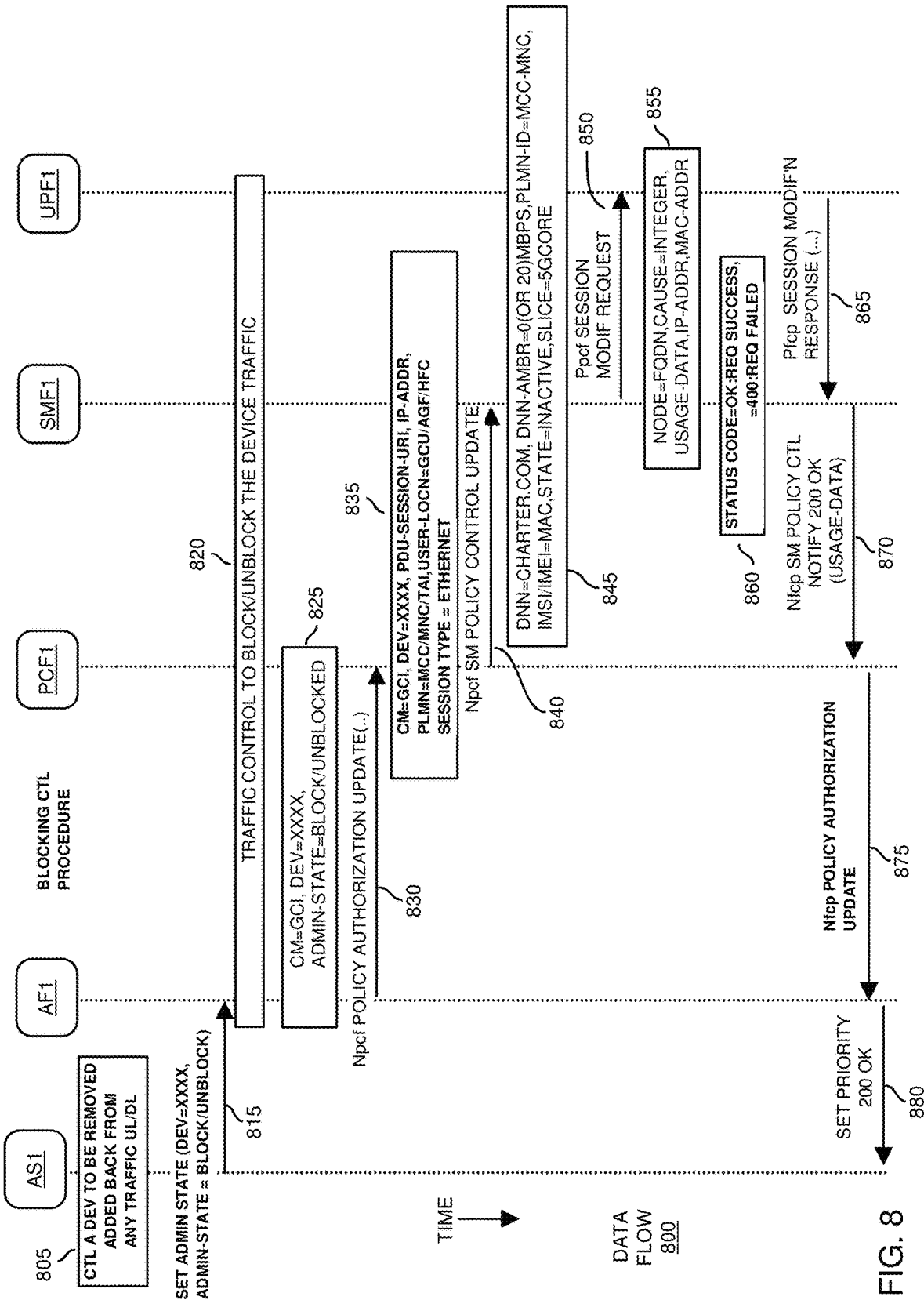
FIG. 8 is an example diagram illustrating dynamic control of user data flows in a communication path via blocking and unblocking as discussed herein.

FIG. 8 is an example diagram illustrating dynamic control of data flows in a communication path via blocking and unblocking as discussed herein.

Note that each of the communications 815, 830, 840, 850, 865, 870, 875, 880, etc., can be transmitted in accordance with HTTP-API or other suitable communication protocol.

Additionally, note that each of the communications (such as communications 815, 820, 825, 830, 835, 840, 845, 850, 855, 860, etc.), as discussed herein can be any of one or more messages, commands, requests, etc. Each of the communications (such as communications 865, 870, 865, 870, 875, 880, etc.), as discussed herein can be any of one or more messages, response, notifications, etc.

Similar to the data flow 700, the data flow 800 changes a device administrative state to a blocked or unblocked state. The blocked state indicates that the UPF1 is to block all traffic associated with the communication device 121 from flowing on the communication user plane data path 220; the unblocked state indicates that the UPF1 is to forward all traffic in accordance with bandwidth limits associated with the communication device 121 through the user plane data path 220.

In each of the data flows 700, 800, and 900, the indication in the message is a device MAC=XXXX (network address), the parameters can include additional information as well.

If only device MAC is in the message, then all applications are treated in the same way as the message indicated.

If an application identifier is in the message, then all parameters are applied only to that application. Other applications won't be impacted. Application identifier is mapped in the UPF as PDU session id. This means the application identifier can be a unique app id, or a set of applications (e.g. scoping of identifiers).

The latest received message is applied to a node setting. The parameters set by a previous message are overwritten.

In this example data flow 800 of FIG. 8, in operation 805, assume that the application server AS1 determines to set a block mode to prevent conveyance of data 510 associated with the communication device 121 over the user plane data path 220 of the communication path 151.

In such an instance, to block data traffic associated with the communication path 151 and corresponding user plane data path 220, the application server AS1 transmits communications 815 over control plane path 210 to the application function AF1 in node 191 to block communications. The communications 815 (such as set ADMINISTRATOR STATE) can be configured to include information such as an identity of the communication device 121 (such as network address XXXX) as well as whether to block corresponding data flows associated with the communication device 121 to the remote network node 199 and corresponding application server AS2.

Via execution of function 820, the application function AF1 communicates with corresponding functions PCF1, SMF1, and UPF1 to implement traffic control data operations to block the conveyance of data over user plane data path 220 of the communication path 151 for traffic of the communication device 121 assigned the network address XXXX.

Yet further, via execution of function 825, the application function AF1 and PCF1 function produce information associated with the data flow policy such as GCI (Global Cable Identifier) indicating the subscriber domain (home network 101) and/or corresponding cable modem (such as communication management resource 140) in which the application server AS1 resides. Additionally, the information associated with function 825 indicates to block corresponding data associated with the communication device 121.

Via communications 830, the application function AF1 communicates a Npcf policy authorization update command to the policy control function PCF1 associated with the network node 191. For example, the application function AF1 sends control message to PCF1 (Policy Control Function) to set up a policy rule (block). The rule determines a device application and how the data traffic from that application is treated by the data forwarder (in UPF1) at network node 191.

Via function 835, the policy control function PCF1 and SMF1 generate information associated with the policy for a respective session.

Via communications 840 (such as modify policy command), the policy control function PCF1 communicates the Npcf SM policy control update to the session management function SMF1 of the network node 191. This causes the update of a control flow policy assigned to the user plane data path 220. This results in generation of the control information 845 such as DNN=CHARTER.COM, DNN-AMBR=0 MBPS, PLMN-ID=MCC-MNC, MSI/IMEI=XXXX. STATE=INACTIVE, SLICE=5 GCORE. If the command (815) indicates to block the data associated with the communication device 121, the DNN-AMBR is set to zero (0). Thus, the DNN-AMBR=0 MBPS indicates assignment of no extra MBPS data flow for use by the communication device 121 to convey data 510 over the user plane data path 220. If the command (815) indicates to unblock the data associated with the communication device 121, the DNN-AMBR is set to 20 MBPS. Thus, the DNN-AMBR=20 MBPS indicates assignment of an extra 20 MBPS data flow for use by the communication device 121 to convey data 510 over the user plane data path 220.

Via communications 850, the session management function SMF1 communicates the Ppcf session modification request command to the user plane function UPF1 of the network node 191.

Function 855 generates information including a node=fully qualified domain name, cause=integer, usage-data, IP-address, and MAC-ADDRESS XXXX associated with the communication device 121.

Via function 860, the function SMF1 generates a success or fail status associated with the policy update (block) for the user plane data path 220.

Via communications 865, the user plane function UPF1 communicates a respective Ppcf session modification response notification to the session management function SMF1 indicating the policy update (block) to the user plane data path 220.

Via communications 870, the session management function SMF1 communicates a respective Npcf session management policy control notify message to the policy control function PCF1.

Via communications 875, the policy control function PCF1 communicates a respective Npcf policy authorization update response to the application function AF1.

Via communication 880, the application function AF1 notifies the application server AS1 and corresponding application executed by the communication management resource 140 that the corresponding block command has been applied to the user plane data path 220 of communication path 151 for communication device 121.

In another example data flow 800 of FIG. 8, in operation 805, assume that the application server AS1 determines to set an unblock mode to allow conveyance of data 510 associated with the communication device 121 over the user plane data path 220 of the communication path 151.

In such an instance, to unblock data traffic associated with the communication path 151 and corresponding user plane data path 220, the application server AS1 transmits communications 815 over control plane path 210 to the application function AF1 in node 191 to unblock communications. The communications 815 (such as set ADMINISTRATOR STATE) can be configured to include information such as an identity of the communication device 121 (such as network address XXXX) as a command to unblock corresponding data flows associated with the communication device 121 to the remote network node 199 and corresponding application server AS2.

Via execution of function 820, the application function AF1 communicates with corresponding functions PCF1, SMF1, and UPF1 to implement traffic control data operations to unblock the conveyance of data over user plane data path 220 of the communication path 151 for traffic of the communication device 121 assigned the network address XXXX.

Yet further, via execution of function 825, the application function AF1 and PCF1 function produce information associated with the data flow policy such as GCI (Global Cable Identifier) indicating the subscriber domain (home network 101) and/or corresponding cable modem (such as communication management resource 140) in which the application server AS1 resides. Additionally, the information associated with function 825 indicates to unblock corresponding data associated with the communication device 121.

Via communications 830, the application function AF1 communicates a Npcf policy authorization update command to the policy control function PCF1 associated with the network node 191. For example, the application function AF1 sends control message to PCF1 (Policy Control Function) to set up a policy rule (unblock). The rule determines a device application and how the data traffic from that application is treated by the data forwarder (in UPF1) at network node 191.

Via function 835, the policy control function PCF1 and SMF1 generate information associated with the policy for a respective session.

Via communications 840 (such as modify policy command), the policy control function PCF1 communicates the Npcf SM policy control update command to the session management function SMF1 of the network node 191. This causes the update of a control flow policy assigned to the user plane data path 220. This results in generation of the control information 845 such as DNN-CHARTER.COM, DNN-AMBR=20 MBPS, PLMN-ID=MCC-MNC, MSI/IMEI=XXXX, STATE=ACTIVE, SLICE=5 GCORE. If the command (815) indicates to block the data associated with the communication device 121, the DNN-AMBR is set to zero (0). Thus, the DNN-AMBR-0 MBPS indicates assignment of no extra MBPS data flow for use by the communication device 121 to convey data 510 over the user plane data path 220. If the command (815) indicates to unblock the data associated with the communication device 121, the DNN-AMBR is set to 20 MBPS. Thus, the DNN-AMBR=20 MBPS indicates assignment of an extra 20 MBPS data flow for use by the communication device 121 to convey data 510 over the user plane data path 220.

Via communications 850, the session management function SMF1 communicates the Ppcf session modification request command to the user plane function UPF1 of the network node 191.

Function 855 generates information including a node=fully qualified domain name, cause=integer, usage-data, IP-address, and MAC-ADDRESS XXXX associated with the communication device 121.

Via function 860, the function SMF1 generates a success or fail status associated with the policy update (unblock) for the user plane data path 220.

Via communications 865, the user plane function UPF1 communicates a respective Ppcf session modification response notification to the session management function SMF1 indicating the policy update (unblock) to the user plane data path 220.

Via communications 870, the session management function SMF1 communicates a respective Npcf session management policy control notification message to the policy control function PCF1.

Via communications 875, the policy control function PCF1 communicates a respective Npcf policy authorization update to the application function AF1.

Via communication 880, the application function AF1 notifies the application server AS1 and corresponding application executed by the communication management resource 140 that the corresponding unblock command has been applied to the user plane data path 220 of communication path 151 for communication device 121.

In this manner, via communications over the control path 210 (such as block or unblock command) to the first network node 191, the communication management resource 140 and corresponding application server AS1 can be configured to control the flow of data over the communication path 151.

Figure 9:
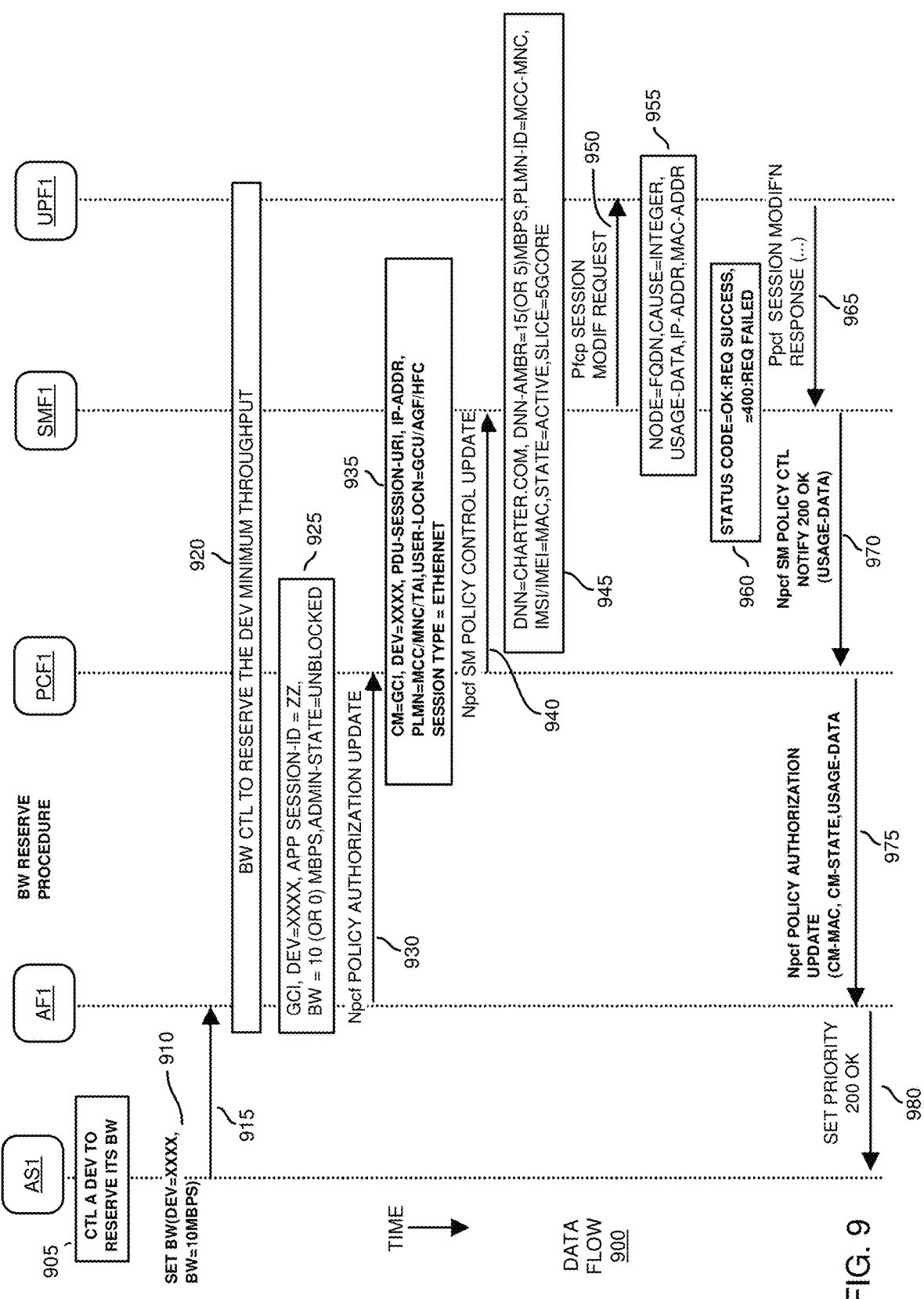
FIG. 9 is an example diagram illustrating reservation of extra bandwidth in a communication path for use by a communication device as discussed herein.

FIG. 9 is an example diagram illustrating reservation of bandwidth in a communication path to a communication device as discussed herein.

Note that each of the communications in data flow 900 can be transmitted in accordance with HTTP-API or other suitable communication protocol.

Additionally, note that each of the communications (such as communications 910, 915, 920, 925, 930, 935, 940, 945, 950, 955, 960, etc.), as discussed herein can be any of one or more messages, commands, requests, etc. Each of the communications (such as communications 955, 960, 965, 970, 975, 980, etc.), as discussed herein can be any of one or more messages, response, notifications, etc.

In this example data flow 900 of FIG. 9, in operation 905, the application server AS1 determines to reserve extra bandwidth for the communication device 121 and conveyance of corresponding data 510 over the user plane data path 220 of the communication path 151.

In such an instance, to reserve extra bandwidth via the communication path 151 and corresponding user plane data path 220, the application server AS1 transmits communications 910 over control plane path 210 to the application function AF1 in node 191 to reserve bandwidth. The communications 915 (such as set BW) can be configured to include information such as an identity of the communication device 121 (such as network address XXXX) as well as an amount of bandwidth such as 10 MBPS.

Via execution of function 920, the application function AF1 communicates with corresponding functions PCF1, SMF1, and UPF1 to implement bandwidth control over the communication path 151 for the communication device 121.

Yet further, via execution of function 925, the application function AF1 and PCF1 function produce information associated with the data flow policy such as GCI (Global Cable Identifier) indicating the subscriber domain (home network 101) and/or corresponding cable modem (such as communication management resource 140) in which the application server AS1 resides. Additionally, the information associated with function 925 indicates to operate in an unblocked mode with 10 MBPS for communication device 121 assigned network address XXXX.

Via communications 930, the application function AF1 communicates an Npcf policy authorization update command to the policy control function PCF1 associated with the network node 191. For example, the application function AF1 sends control message to PCF1 (Policy Control Function) to set up a policy rule. The rule determines a device application and how the data traffic from that application is treated by the data forwarder (in UPF1) at network node 191.

Via function 935, the policy control function PCF1 and SMF1 generate information associated with the policy for a respective session (bandwidth reservation). Via communications 940 (such as modify policy command), the policy control function PCF1 communicates the Npcf SM policy control update command to the session management function SMF1 of the network node 191. This causes the update of a control flow policy assigned to the user plane data path 220 in accordance with the newly reserved bandwidth of 10 MBPS. This results in generation of the control information 945 such as DNN=CHARTER.COM, DNN-AMBR=15 or (5) MBPS, PLMN-ID=MCC-MNC, MSI/IMEI=XXXX, STATE=ACTIVE, SLICE=5 GCORE.

Via communications 950, the session management function SMF1 communicates the Ppcf session modification request command to the user plane function UPF1 of the network node 191.

Function 955 generates information including a node=fully qualified domain name, cause=integer, usagedata, IP-address, and MAC-ADDRESS XXXX associated with the communication device 121.

Via function 960, the function SMF1 generates a success or fail status associated with the policy update (reserve bandwidth command) for the user plane data path 220.

Via communications 965, the user plane function UPF1 communicates a respective Ppcf session modification response notification to the session management function SMF1 indicating the policy update (bandwidth reservation) to the user plane data path 220.

Via communications 970, the session management function SMF1 communicates a respective Npcf session management policy control notification message associated with the bandwidth reservation to the policy control function PCF1.

Via communications 975, the policy control function PCF1 communicates a respective Npcf policy authorization update associated with the bandwidth reservation to the application function AF1.

Via communication 980, the application function AF1 notifies the application server AS1 and corresponding application executed by the communication management resource 140 that the corresponding bandwidth reservation command has been applied to the user plane data path 220 of communication path 151 for communication device 121.

Figure 10:
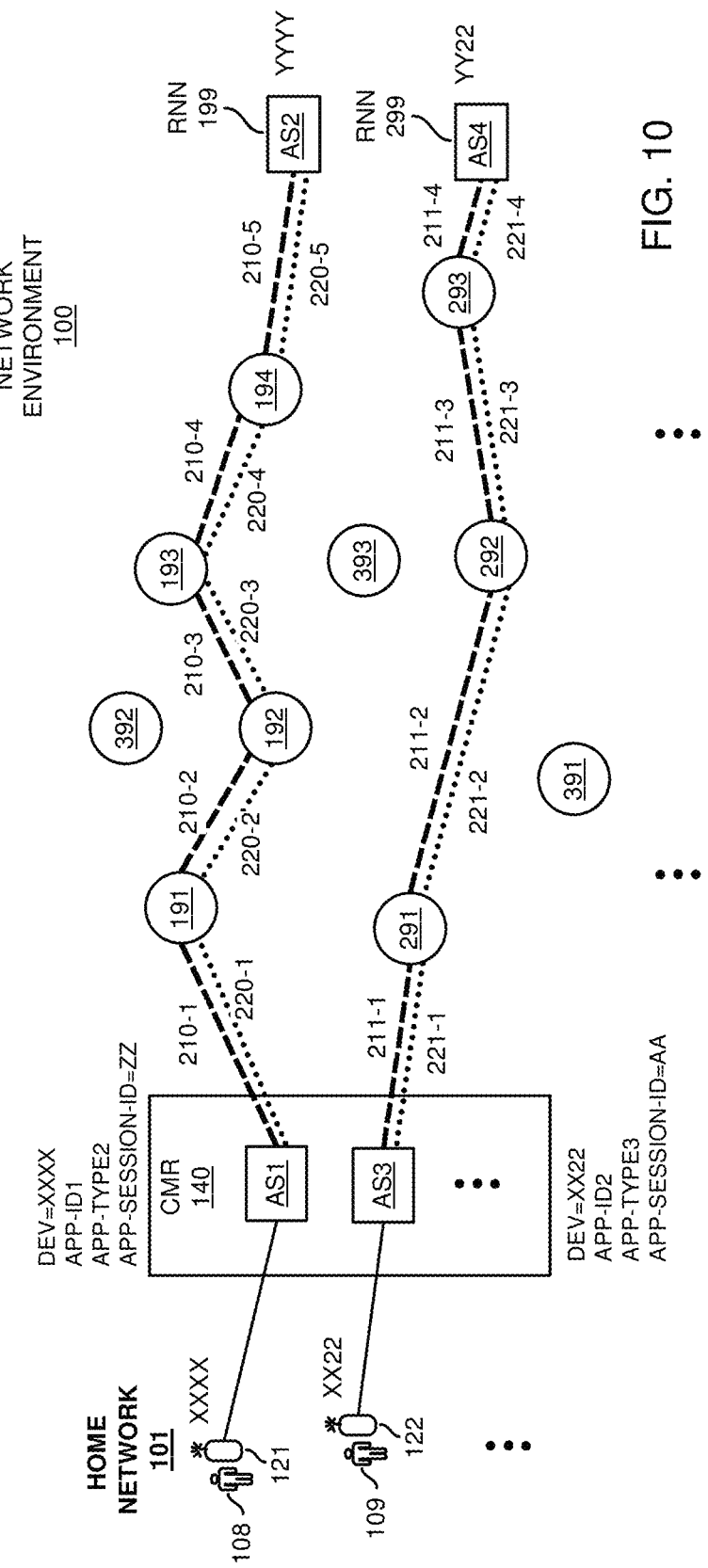
FIG. 10 is an example diagram illustrating establishment of multiple communication paths and individual control of conveying data as discussed herein.

FIG. 10 is an example diagram illustrating establishment of multiple circuit paths and individual control of conveying data as discussed herein.

In a manner as previously discussed, the communication management resource 140 can be configured to execute a first application at the application server AS1 on behalf of the communication device 121 requesting to communicate to or receive data from the remote network node 199. As indicated in the previous drawings and corresponding description, an application (APP-ID1) executed on the communication management resource 140 and corresponding application server AS1 establishes a respective control path 210 and corresponding data path 220 (associated with communication path 151) between the communication management resource 140 and the remote network node 199. The application APP-ID1 executed on the application server AS1 controls attributes (data flow control policy for communication device 121) such as bandwidth, priority, latency, bandwidth reservation, block, unblock, etc., associated with the user plane data path 220 via control communications (policy information) transmitted over the control path 210 to one or more of the different application functions. For example, as previously discussed, the applications server AS1 sends communications over control path 210 to one or more network nodes in the communication path 151; the control settings are settings applied by the application functions in the network nodes to the data path 220.

The communication management resource 140 can be configured to establish a respective communication path associated with each of the different communication devices operated in the home network 101.

For example, the user 109 operating the communication device 122 assigned network address XX22 communicates a request to the communication management resource 140. The request indicates to establish connectivity with the remote network node 299 assigned network address YY22. In response to this request, the communication management resource initiates execution of a respective application assigned APP-ID2 to provide the quality of service parameters and control the connectivity of the communication device 122 with the remote network node 299 via a second communication path including control plane path 211 and user plane data path 221. In a manner as previously discussed, the application executing on the application server AS3 (for communication device XX22, via application APP-ID2, etc.) establishes a respective control path 211 and corresponding communication path segments 211-1, 211-2, 211-3, and 211-4 between the communication management resource 140 and the remote network node 199.

Via further control communications over the control path 211, the application APP-ID2 executing (on behalf of the communication device 122) on the communication management resource 140 and application server AS3 controls data flows associated with the established corresponding user plane data path 221 between the application server AS3 and the application server AS4 in the remote network node 299.

Thus, the communication management resource 140 can be configured to execute a second application APP-ID2 at the application server AS2 on behalf of the communication device 122 requesting to communicate to or receive data from the remote network node 299. As indicated in the previous drawings and corresponding description, an application (APP-ID2) executed on the communication management resource 140 and corresponding application server AS3 establishes a respective control plane path 211 and corresponding user plane data path 221 (associated with communication path 151) between the communication management resource 140 and the remote network node 299. The application APP-ID2 executed on the application server AS3 controls attributes (data flow control policy for communication device 122) such as bandwidth, priority, latency, extra bandwidth reservation, block, unblock, etc., associated with the user plane data path 221 via control communications (policy information) transmitted over the control path 211 to one or more of the different application functions associated with the corresponding network nodes 291, 292, 293, etc., in the communication path. For example, as previously discussed, the applications server AS3 sends communications over control path 211 and corresponding segments 211-1, 211-2, etc., to one or more network nodes 291, 292, 293, etc., in the second communication path (combination of control path 211 and data path 221); the control settings communicated over the control plane path 211 are settings applied by respective application functions in the network nodes to the user plane data path 221.

Traffic Control Algorithm

Communication device Nx: set of devices connected

Ny: subset of Nx and sending traffics<Vy bps (configurable, e.g. Vy=4 kbps)

Nz: subset of Nx and sending traffics>=Vy bps

Household aggregated total bandwidth capacity is T bps

Weighting high priority is wh factor to the normal priority wn (high vs normal is wh:wn)

Considering devices in Nz: # of devices setting to high priority is nh, # of devices setting to normal priority is nn.

All devices in Ny shall be granted with their whole traffics without a limitation, the total said to be Ty All devices in Nz shall obtain a fair share from the total capacity T−Ty>=0:

> A device in $Nz$ with high priority:each high priority device obtains$[1/(nh{+}nn)]*[wh/(wh{+}wn)]$percentile from$(T{-}Ty)$ A device in Nz with normal priority: each normal priority device obtains $$[1/(nh+nn)]*[wn/(wh+wn)]*(T-Ty)$$

EXAMPLE

Assume wh=2, Wn=1, there are 2 devices total where first device is high and second normal, then a high priority device gets (1/1)*(⅔) bandwidth. Another normal priority device gets (1/1)*(⅓) bandwidth.

SMF Algorithm—A Device Starts with Low Traffic

Pre-condition: Alpha is a device in Nx and not in Ny and not in Nz (or not in Ny and in Nz)

Alpha starts to transmit traffic Alpha-x (bps) and it becomes to be a new device in Ny (alpha-x<Vy)

Nz − alpha (device Alpha can not be in the set of Nz)

Ny + alpha (device Alpha is added to the set of Ny)

Prior state is as previous page calculation

Throughput of alpha is 0 in prior state and now alpha-x alpha device in Ny shall be granted with its whole traffics without a limitation, the new total throughput said to be Ty-new:=Ty-old+alpha-x<T All devices in Nz shall obtain a fair share from the total capacity T−Ty-new>=0:

A device in Nz with high priority: each high priority device obtains $$[1/(nh+nn)]*[wh/(wh+wn)]\text{percentile from}(T-Ty\text{-new})$$

A device in Nz with normal priority: each normal priority device obtains $$[1/(nh+nn)]*[wn/(wh+wn)]*(T-Ty\text{-new})$$

SMF Algorithm—A Device Starts High Traffic

Prior-condition: Alpha is a device in Nx and not in Ny and not in Nz (or in Ny and not in Nz)

Alpha starts to transmit traffic Alpha-x (bps) and it becomes to be a new device in $$Nz(\text{alpha-}x >= Vy)$$

Nz + alpha (device Alpha is added to the set of Nz)

Ny − alpha (device Alpha can not be in the set of Ny)

Prior state is as previous page calculation

Throughput of alpha is 0, or less than Vy, in prior state and now alpha-x alpha device in Nz shall be granted with its whole traffics without a limitation, if $$Tz\text{-new} := Tz\text{-old} + \text{alpha-}x < T - Vy$$

All devices in Ny remains unchanged policy.

All devices in Nz, including alpha, shall obtain a new share from the total capacity T−Tz-new>=0:

A device in Nz with high priority: each high priority device obtains $$[1/(nh+nn)]*[wh/(wh+wn)]\text{percentile from}(T-Ty\text{-new})$$

A device in Nz with normal priority: each normal priority device obtains $$[1/(nh+nn)]*[wn/(wh+wn)]*(T-Ty\text{-new})$$

SMF Algorithm—Device Traffic Volume is Below its Policy Given Capacity

Prior-condition: Alpha is a device in Nx and Nz, not in Ny

Alpha starts to transmit traffic Alpha-x (bps) and it becomes to be a new device in $$Nz(\text{alpha-}x >= Vy)$$

Nz + alpha (device Alpha is added to the set of Nz)
Ny − alpha (device Alpha can not be in the set of Ny)
The policy determines its max capacity is Tz-cap
Tz-cap is determined by the formula:

If the device is high priority:$Tz$-cap:=$[1/(nh+nn)]$*
$[wh/(wh+wn)]$percentile from$(T−Ty$-new)

If the device is normal priority:$Tz$-cap:=$[1/(nh+nn)]$*
$[wn/(wh+wn)]$*$(T−Ty$-new)

the total capacity alpha-x−Tz-cap<0
The whole Alpha-x throughput is granted while Alpha-x
is less than its max capacity Tz-cap
The unused capacity is Tz-alpha=Tz-cap−alpha-x
Tz-alpha is shared by all devices in Nz
If a device is high priority, its new capacity is $$Tz\text{-cap} := [1/(nh+nn)]*[wh/(wh+wn)]*(T+Tz\text{-alpha}−Ty\text{-new})$$

$$Tz\text{-cap} := [1/(nh+nn)]*[wn/(wh+wn)]*(T+Tz\text{-alpha}−Ty\text{-new})$$

Figure 11:
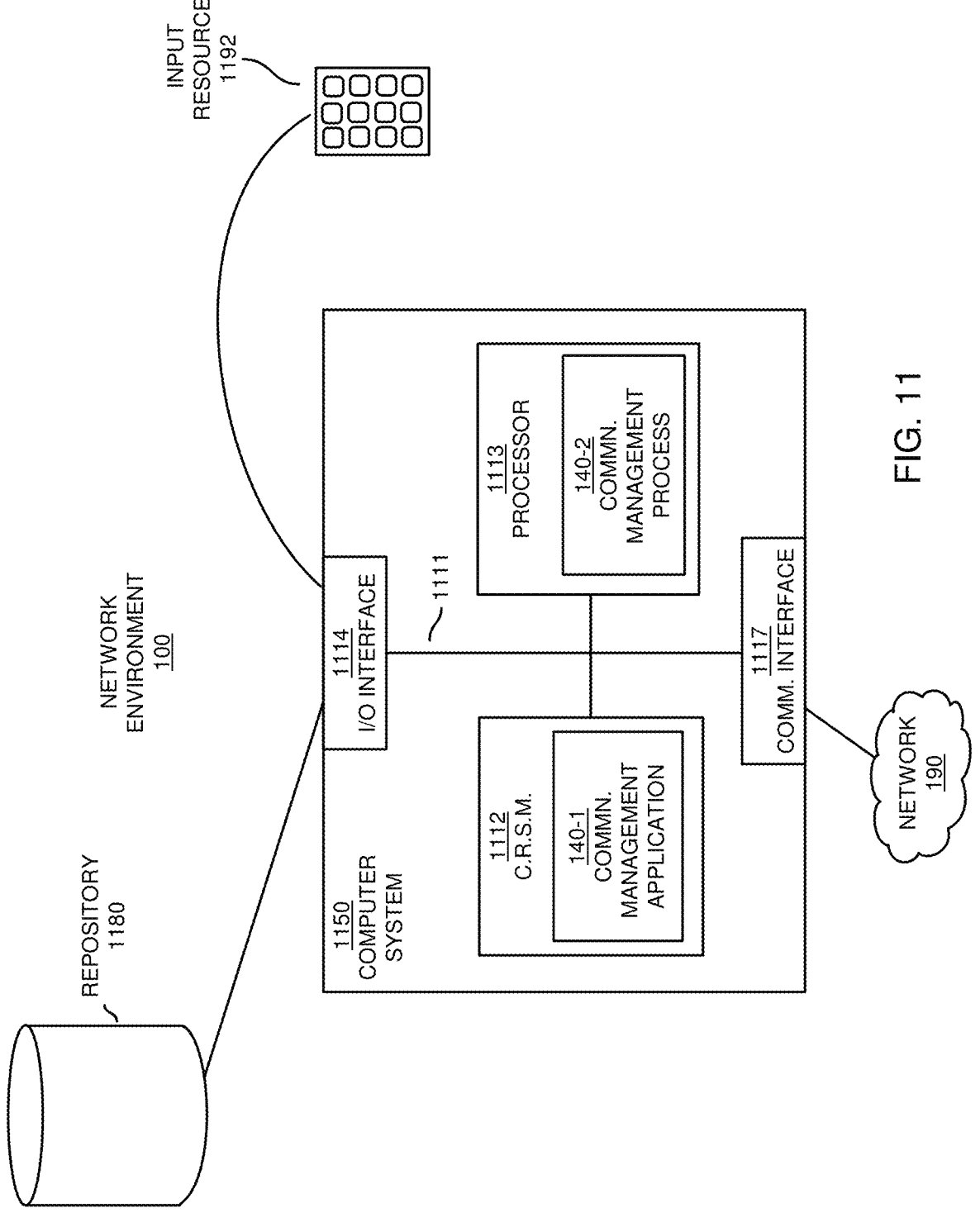
FIG. 11 is an example diagram illustrating example computer hardware and software operable to execute operations according to embodiments herein.
Figure 12:
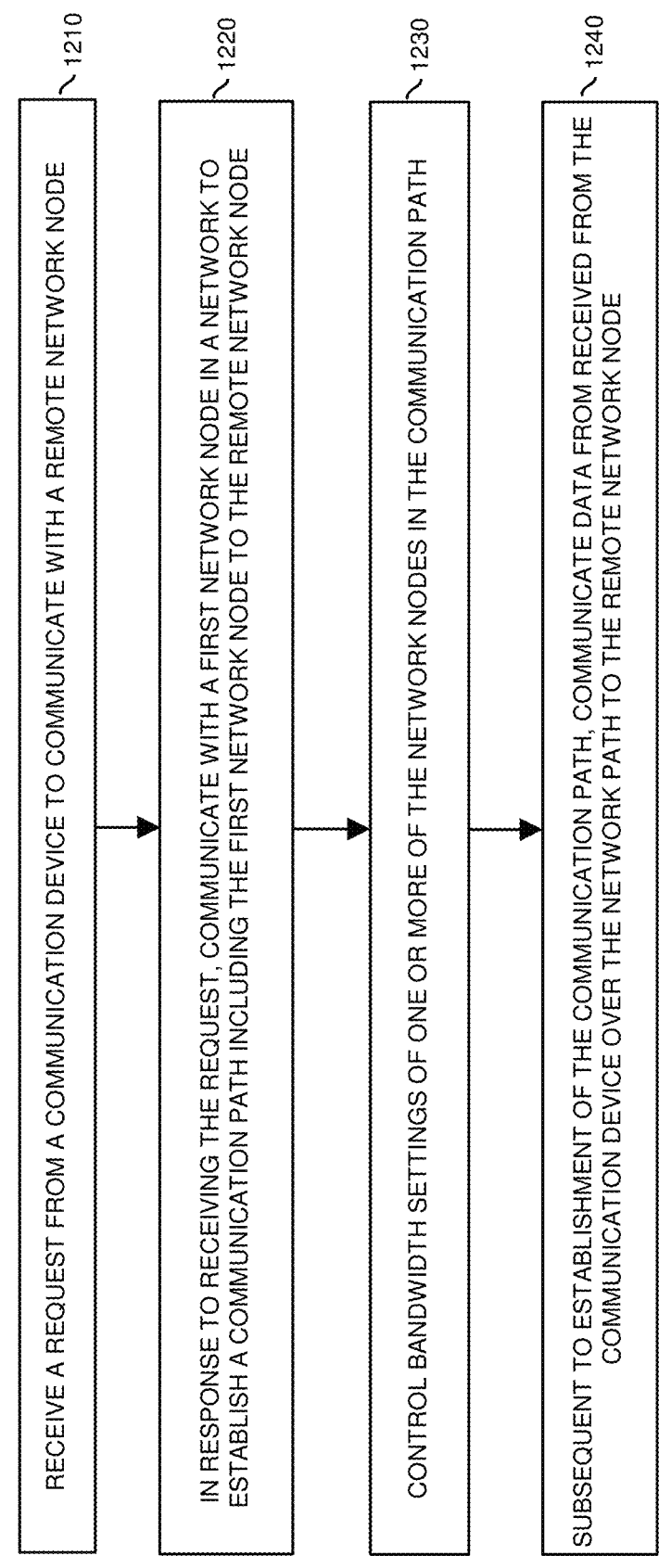
FIG. 12 is an example diagram illustrating a method according to embodiments herein.

Novel Algorithm in Case of Traffic Congestion)
When T−Ty<0,
then all high priority devices in Ny are forwarded imme-
diately.
Then normal priority devices in Ny with round-robin in a
constant number of packets passing through, until the T is
reached.
Traffic from Devices in Nz are written into a cache (or a
temp memory such as RAM) and wait until T−Ty>=0
When T−Ty>=0,
All traffics from Ny devices pass through,
The method of traffic control is applied
Novel Algorithm—Bandwidth Reservation
A device is reserved with a minimum throughput (max
aggregated bit rate),
The device is assigned with a maximum aggregated bit
rate, saying v1 (mbps). Then the throughput can go up to v1.
When the bandwidth, saying v2 (mbps), is additionally
received by the core node for that device, then it obtains the
max aggregated bit rate up to the v1+v2 (mbps)
Core node overwrites the v2 (mbps) with the most
recently received setting.
When v2=0 (mbps), it indicates there is no bandwidth
reserved for the device.
When a household has a total max bandwidth, saying
subscription of v-total (mbps). A device is assigned with a
reserved bandwidth of v2 (mbps), then the total household
max available bandwidth is v+v2 (mbps)
The device bandwidth increased with v2 means also the
total household budget increase v2.
Until the physical upper limitation is reached. The ceiling
can be derived by the least bandwidth capacity in the data
path in the household, e.g. the cable modem, or the wifi, or
the application network configured max peak rate.
FIG. 11 is an example block diagram of a computer
system for implementing any of the operations as previously
discussed according to embodiments herein.
Note that any of the resources (such as any communica-
tion management resource, application server, any of the
network nodes, communication device, etc.) as discussed
herein can be configured to include computer processor
hardware and/or corresponding executable instructions to
carry out the different operations as discussed herein.
For example, as shown, computer system 1150 of the
present example includes interconnect 1111 coupling computer readable storage media 1112 such as a non-transitory
type of media (or any suitable type of hardware storage
medium in which digital information can be stored and or
retrieved), a processor 1113 (computer processor hardware),
I/O) interface 1114, and a communications interface 1117.
I/O interface(s) 1114 supports connectivity to repository
1180 and input resource 1192.
Computer readable storage medium 1112 can be any
hardware storage device such as memory, optical storage,
hard drive, floppy disk, etc. In one embodiment, the com-
puter readable storage medium 1112 is computer-readable
storage hardware that stores instructions and/or data.
As shown, computer readable storage media 1112 can be
encoded with communication management application
140-1 (e.g., including instructions) in a respective wireless
station to carry out any of the operations as discussed herein.
During operation of one embodiment, processor 1113
accesses computer readable storage media 1112 via the use
of interconnect 1111 in order to launch, run, execute, inter-
pret or otherwise perform the instructions in communication
management application 140-1 (function associated with a
respective communication management resource) stored on
computer readable storage medium 1112. Execution of the
communication management application 140-1 (a.k.a., man-
agement application associated with the communication
management resource 140) produces communication man-
agement process 140-2 (a.k.a., management process associ-
ated with communication management resource 140) to
carry out any of the operations and/or processes as discussed
herein.
Those skilled in the art will understand that the computer
system 1150 can include other processes and/or software and
hardware components, such as an operating system that
controls allocation and use of hardware resources to execute
the communication management application 140-1.
In accordance with different embodiments, note that com-
puter system may reside in any of various types of devices,
including, but not limited to, a mobile computer, a personal
computer system, a wireless device, a wireless access point,
a base station, phone device, desktop computer, laptop,
notebook, netbook computer, mainframe computer system,
handheld computer, workstation, network computer, appli-
cation server, storage device, a consumer electronics device
such as a camera, camcorder, set top box, mobile device,
video game console, handheld video game device, a periph-
eral device such as a switch, modem, router, set-top box,
content management device, handheld remote control
device, any type of computing or electronic device, etc. The
computer system 1150 may reside at any location or can be
included in any suitable resource in any network environ-
ment to implement functionality as discussed herein.
Functionality supported by the different resources will
now be discussed via flowcharts in FIG. 12. Note that the
steps in the flowcharts below can be executed in any suitable
order.
FIG. 12 is a flowchart 1200 illustrating an example
method according to embodiments herein. Note that there
will be some overlap with respect to concepts as discussed
above.
In processing operation 1210, the communication man-
agement resource 140 receives a request from a communi-
cation device to communicate with a remote network node.
In processing operation 1220, in response to receiving the
request, the communication management resource 140 com-
municates with a first network node in a network to establish
a communication path including the first network node to the
remote network node.

In processing operation 1230, the communication management resource 140 controls bandwidth settings of one or more of the network nodes in the communication path.

In processing operation 1240, subsequent to establishment of the communication path and applying appropriate control settings, the communication management resource 140 communicates data received from the communication device over the communication path to the remote network node.

Note again those techniques herein are well suited to facilitate processing of available physical infrastructure information and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating." "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:

at communication management hardware, receiving a request from a communication device to communicate with a remote network node;

in response to receiving the request, communicating with a first network node in a network environment to establish a communication path including the first network node to the remote network node, the first network node configured with first next hop forwarding information during establishment of the communication path; and subsequent to the establishment of the communication path, communicating data received from the communication device over the network path to the remote network node.

2. The method as in claim 1 further comprising:

communicating a control command in a control plane of the communication path to the first network node, the command indicating to control attributes of the communication path in the network environment between an application executed by the communication management hardware and the remote network node, the communication path supporting conveyance of the data.

3. The method as in claim 2, wherein the control command incudes: i) an identity of the communication device, ii) an identity of the remote network node, iii) an identity of the application executed on the communication management hardware, and iv) data flow bandwidth settings associated with the communication path.

4. The method as in claim 2, wherein the control command causes the first network node to establish the communication path via forwarding of the control command to a second network node in the network, wherein forwarding of the control command from the first network node to the second network node causes the second network node to be included in the communication path.

5. The method as in claim 1, wherein the first network node is operative to communicate with a second network node in the network based on the first next hop forwarding information implemented at the first network node, the first next hop forwarding information indicating the second network node as a next hop node with respect to the first network node to establish the communication path to the remote network node.

6. The method as in claim 5, wherein communicating with the first network node includes: communicating a path setup command from the communication management hardware to the first network node in accordance with an application layer communication protocol, the path setup command indicating settings in which to establish the communication path between the communication management hardware and the remote network node; and wherein the first network node is operative to communicate with the second network node in accordance with the application layer communication protocol in response to receiving the path setup command from the communication management hardware.

7. The method as in claim 1, wherein communicating with the first network node includes communicating a path setup command to the first network node;

in response to communicating the path setup command, receiving a first acknowledgement message from the first network node, the first acknowledgement message indicating conveyance of the path setup command through a sequence of network nodes in the network to the remote network node, the sequence of network nodes included in the communication path.

8. The method as in claim 7 further comprising:

subsequent to receiving the first acknowledgement message, communicating a data flow control setting command to the first network node, the data flow control setting command indicating to apply data flow control settings for the a-communication device in communication with the communication management hardware; and wherein communication of the data flow control setting command prompts each respective network node of the network nodes in the sequence to establish the communication path via corresponding user plane functionality in the respective network node.

9. The method as in claim 8 further comprising:

in response to communicating the data flow control setting command to the first network node, receiving a second acknowledgement message from the first network node, the second acknowledgement message indicating application of the data flow control settings for the communication device to at least one network node in the sequence;

wherein communicating the data received from the communication device over the network includes: i) receiving the data from the communication device; and ii) transmitting the data from the communication management hardware over the communication path, the data conveyed over the communication path via the corresponding user plane functionality in the network nodes in the sequence between the communication management hardware and the remote network node.

10. The method as in claim 1 further comprising:

in response to receiving a notification to adjust bandwidth supported by the communication path for the communication device, communicating a bandwidth adjustment command to the first network node, the first network node being one of multiple network nodes in a sequence of network nodes supporting the communication path between the communication management hardware and the remote network node; and wherein communication of the bandwidth adjustment command to the first network node prompts the first network node to adjust a corresponding bandwidth limit applied to conveyance of the data through the first network node over the communication path to the remote network node.

11. The method as in claim 1 further comprising:

in response to receiving a notification to provide supplemental bandwidth over a bandwidth limit amount assigned to a subscriber domain associated with the communication management hardware, communicating a bandwidth adjustment command to the first network node, the first network node being one of multiple network nodes in a sequence of network nodes supporting the communication path between the communication management hardware and the remote network node, the bandwidth adjust command indicating that the supplemental bandwidth is to be applied to data flow control settings associated with conveying the data received from the communication device over the communication path.

12. The method as in claim 1, wherein communicating with the first network node includes communication of a control command from the communication management hardware to the first network node, the control command including: i) an identity of the communication device, and ii) data flow bandwidth settings associated with conveyance of the data over the communication path.

13. The method as in claim 1, wherein communicating with the first network node includes communication of a control command from the communication management hardware to the first network node; and wherein receipt of the control command at the first network node causes the first network node to establish the communication path via forwarding of the control command to a second network node in the network.

14. The method as in claim 13, wherein forwarding of the control command to the second network node configures the second network node for inclusion in the communication path.

15. The method as in claim 1, wherein communicating with the first network node includes: communicating a path setup command from the communication management hardware to the first network node, the path setup command indicating settings in which to establish the communication path between the communication management hardware and the remote network node; and wherein the first network node is operative to communicate with a second network node in response to receiving the path setup command from the communication management hardware.

16. The method as in claim 1 further comprising:

subsequent to establishing the communication path, communicating a data flow control setting command to the first network node, the data flow control setting command indicating to apply data flow control settings to the data received from the communication device for conveyance over the communication path.

17. The method as in claim 1 further comprising:

subsequent to establishing the communication path, communicating a bandwidth adjustment command from the communication management hardware to the first network node; and wherein communication of the bandwidth adjustment command to the first network node prompts the first network node to adjust a corresponding bandwidth of the first network node conveying the data over the communication path to a second network node in the communication path.

18. The method as in claim 1, wherein the first next hop forwarding information indicates an identity of a second network node in the communication path, the second network node configured with second next hop forwarding information; and wherein the second next hop forwarding information indicates an identity of a third network node in the communication path, the third network node configured with third next hop forwarding information.

19. A system comprising:

communication management hardware operative to:
    receive a request from a communication device to communicate with a remote network node;
    in response to receiving the request, communicate with a first network node in a network to establish a communication path including the first network node to the remote network node, the first network node configured with first next hop forwarding information during establishment of the communication path; and
    subsequent to the establishment of the communication path, communicate data received from the communication device over the network path to the remote network node.

20. The system as in claim 19, wherein the communication management hardware is further operative to:

communicate a control command in a control plane of the communication path to the first network node, the command indicating to control attributes of the communication path in the network environment between an application executed by the communication management hardware and the remote network node, the communication path supporting conveyance of the data.

21. The system as in claim 20, wherein the control command incudes: i) an identity of the communication device, ii) an identity of the remote network node, iii) an identity of the application executed on the communication management hardware, and iv) data flow bandwidth settings associated with the communication path.

22. The system as in claim 20, wherein the control command causes the first network node to establish the communication path via forwarding of the control command to a second network node in the network, wherein forwarding of the control command from the first network node to the second network node causes the second network node to be included in the communication path.

23. The system as in claim 20, wherein the first network node is operative to communicate with a second network node in the network based on the first next hop forwarding information implemented at the first network node, the first next hop forwarding information indicating the second network node as a next hop node with respect to the first network node to establish the communication path to the remote network node.

24. The system as in claim 23, wherein the communication management hardware is further operative to:

communicate a path setup command from the communication management hardware to the first network node in accordance with an application layer communication protocol, the path setup command indicating settings in which to establish the communication path between the communication management hardware and the remote network node; and wherein the first network node is operative to communicate with the second network node in accordance with the application layer communication protocol in response to receiving the path setup command from the communication management hardware.

25. The system as in claim 19, wherein the communication management hardware is further operative to:

communicate a path setup command to the first network node;

in response to communicating the path setup command, receive a first acknowledgement message from the first network node, the first acknowledgement message indicating conveyance of the path setup command through a sequence of network nodes in the network to the remote network node, the sequence of network nodes included in the communication path.

26. The system as in claim 25, wherein the communication management hardware is further operative to:

subsequent to receiving the first acknowledgement message, communicate a data flow control setting command to the first network node, the data flow control setting command indicating to apply data flow control settings for the communication device in communication with the communication management hardware; and wherein communication of the data flow control setting command prompts each respective network node of the network nodes in the sequence to establish the communication path via corresponding user plane functionality in the respective network node.

27. The system as in claim 26, wherein the communication management hardware is further operative to:

in response to communicating the data flow control setting command to the first network node, receive a second acknowledgement message from the first network node, the second acknowledgement message indicating application of the data flow control settings for the communication device to at least one network node in the sequence;

receive the data from the communication device; and transmit the data from the communication management hardware over the communication path, the data conveyed over the communication path via the corresponding user plane functionality in the network nodes in the sequence between the communication management hardware and the remote network node.

28. The system as in claim 19, wherein the communication management hardware is further operative to:

in response to receiving a notification to adjust bandwidth supported by the communication path for the communication device, communicate a bandwidth adjustment command to the first network node, the first network node being one of multiple network nodes in a sequence of network nodes supporting the communication path between the communication management hardware and the remote network node; and wherein communication of the bandwidth adjustment command to the first network node prompts the first network node to adjust a corresponding bandwidth limit applied to conveyance of the data through the first network node over the communication path to the remote network node.

29. The system as in claim 19, wherein the communication management hardware is further operative to:

in response to receiving a notification to provide supplemental bandwidth over a bandwidth limit amount assigned to a subscriber domain associated with the communication management hardware, communicate a bandwidth adjustment command to the first network node, the first network node being one of multiple network nodes in a sequence of network nodes supporting the communication path between the communication management hardware and the remote network node, the bandwidth adjust command indicating that the supplemental bandwidth is to be applied to data flow control settings associated with conveying the data received from the communication device over the communication path.

30. Computer-readable storage hardware having instructions stored thereon, the instructions, when carried out by computer processor hardware, cause the computer processor hardware to:

receive a request from a communication device to communicate with a remote network node;

in response to receiving the request, communicate with a first network node in a network to establish a communication path including the first network node to the remote network node, the first network node configured with first next hop forwarding information during establishment of the communication path; and subsequent to establishment of the communication path, communicate data from-received from the communication device over the network path to the remote network node.

31. The method as in claim 1, where the communication path includes multiple network nodes including the first network node; and wherein the communication path is a static communication path in which each respective network node of the multiple network nodes in the communication path is configured to support conveyance of the data in accordance with corresponding router forwarding information assigned to the respective network node.

\* \* \* \* \*